(12) United States Patent
Park et al.

(10) Patent No.: US 9,586,198 B2
(45) Date of Patent: Mar. 7, 2017

(54) COBALT-BASED CATALYST ON METAL STRUCTURE FOR SELECTIVE PRODUCTION OF SYNTHETIC OIL VIA FISCHER-TROPSCH REACTION, METHOD OF PREPARING THE SAME, AND METHOD OF SELECTIVELY PRODUCING SYNTHETIC OIL USING THE SAME

(71) Applicant: KOREA INSTITUTE OF ENERGY RESEARCH, Daejeon (KR)

(72) Inventors: Ji-Chan Park, Daejeon (KR); Heon Jung, Daejeon (KR); Ho-Tae Lee, Daejeon (KR); Jung-Il Yang, Daejeon (KR); Dong-Hyun Chun, Daejeon (KR); Sung-Jun Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 405 days.

(21) Appl. No.: 14/391,847

(22) PCT Filed: Oct. 24, 2013

(86) PCT No.: PCT/KR2013/009508
§ 371 (c)(1),
(2) Date: Oct. 10, 2014

(87) PCT Pub. No.: WO2015/060472
PCT Pub. Date: Apr. 30, 2015

(65) Prior Publication Data
US 2016/0303555 A1 Oct. 20, 2016

(30) Foreign Application Priority Data
Oct. 22, 2013 (KR) .................. 10-2013-0126228

(51) Int. Cl.
*B01J 29/40* (2006.01)
*B01J 31/28* (2006.01)
(Continued)

(52) U.S. Cl.
CPC ............... *B01J 31/28* (2013.01); *B01J 21/04* (2013.01); *B01J 21/08* (2013.01); *B01J 23/75* (2013.01);
(Continued)

(58) Field of Classification Search
CPC ... B01J 21/04; B01J 21/08; B01J 23/75; B01J 23/8913; B01J 29/04; B01J 29/40;
(Continued)

(56) References Cited

U.S. PATENT DOCUMENTS 4,605,680 A 8/1986 Beuther et al.
4,717,702 A 1/1988 Beuther et al.
(Continued)

FOREIGN PATENT DOCUMENTS

JP 2013-511383 A 4/2013
KR 10-2001-0000417 A 1/2001
(Continued)

OTHER PUBLICATIONS

M. Montes et al., "Fischer-Tropsch synthesis in microchannels", Chemical Engineering Journal, 2011, pp. 536-544, vol. 167.

*Primary Examiner* — Patricia L Hailey
(74) *Attorney, Agent, or Firm* — Rabin & Berdo, P.C.

(57) ABSTRACT

This invention relates to a cobalt-based catalyst on a metal structure for selective production of synthetic oil via Fischer-Tropsch reaction, a method of preparing the same and a method of selectively producing synthetic oil using the same, wherein zeolite, cobalt and a support are mixed and ground to give a catalyst sol, which is then uniformly thinly applied on the surface of a metal structure using a spray-
(Continued)

coating process, thereby preventing generation of heat during Fischer-Tropsch reaction and selectively producing synthetic oil having a carbon chain shorter than that of wax. This catalyst is prepared by burning a powder mixture obtained by melt infiltration of a cobalt hydrate and a metal oxide support to give a catalyst powder including cobalt oxide/metal oxide support; hybridizing the catalyst powder including cobalt oxide/metal oxide support with a zeolite powder to give a hybrid catalyst powder; mixing the hybrid catalyst powder with an organic binder and an inorganic binder and grinding the mixed hybrid catalyst powder to give a hybrid catalyst sol; spray-coating a metal structure surface-treated with alumina by atomic layer deposition with the hybrid catalyst sol; and thermally treating the metal structure spray-coated with the hybrid catalyst sol.

15 Claims, 19 Drawing Sheets

(51) Int. Cl.

| | | |
|---|---|---|
| *B01J 23/75* | (2006.01) | |
| *B01J 37/02* | (2006.01) | |
| *B01J 29/06* | (2006.01) | |
| *B01J 35/10* | (2006.01) | |
| *B01J 37/00* | (2006.01) | |
| *B01J 21/04* | (2006.01) | |
| *B01J 21/08* | (2006.01) | |
| *B01J 23/755* | (2006.01) | |
| *B01J 23/89* | (2006.01) | |
| *B01J 31/06* | (2006.01) | |
| *B01J 35/00* | (2006.01) | |
| *B01J 35/04* | (2006.01) | |
| *B01J 37/14* | (2006.01) | |
| *C10G 2/00* | (2006.01) | |

(52) U.S. Cl.
CPC ......... *B01J 23/755* (2013.01); *B01J 23/8913* (2013.01); *B01J 29/06* (2013.01); *B01J 29/40* (2013.01); *B01J 31/06* (2013.01); *B01J 35/0006* (2013.01); *B01J 35/0013* (2013.01); *B01J 35/04* (2013.01); *B01J 35/1019* (2013.01); *B01J 35/1038* (2013.01); *B01J 35/1042* (2013.01); *B01J 35/1076* (2013.01); *B01J 37/0018* (2013.01); *B01J 37/0045* (2013.01); *B01J 37/0201* (2013.01); *B01J 37/023* (2013.01); *B01J 37/0219* (2013.01); *B01J 37/0225* (2013.01); *B01J 37/0232* (2013.01); *B01J 37/14* (2013.01); *C10G 2/331* (2013.01); *B01J 2231/62* (2013.01); *B01J 2531/005* (2013.01); *C10G 2400/22* (2013.01)

(58) Field of Classification Search
CPC B01J 35/1019; B01J 35/1038; B01J 35/1042; B01J 35/1076; B01J 37/0018; B01J 37/0045; B01J 37/0201; B01J 37/0219; B01J 37/0225; B01J 37/023; B01J 37/0232; B01J 37/14; C10G 2/331
USPC ................ 502/245, 260, 261, 263, 326, 327
See application file for complete search history.

(56) References Cited

U.S. PATENT DOCUMENTS

| | | | |
|---|---|---|---|
| 5,157,054 A | 10/1992 | Herbolzheimer et al. | |
| 5,348,982 A | 9/1994 | Herbolzheimer et al. | |
| 5,422,375 A | 6/1995 | Rytter et al. | |
| 5,599,849 A | 2/1997 | Jager et al. | |
| 6,130,184 A | 10/2000 | Geerlings et al. | |
| 6,211,255 B1 | 4/2001 | Schanke et al. | |
| 6,486,221 B2* | 11/2002 | Lapidus | B01J 23/75 502/325 |
| 6,537,945 B2 | 3/2003 | Singleton et al. | |
| 6,740,621 B2 | 5/2004 | Singleton et al. | |
| 7,984,180 B2 | 7/2011 | Pope et al. | |
| 8,263,523 B2* | 9/2012 | Kibby | B01J 29/072 502/240 |
| 8,962,703 B2* | 2/2015 | Park | C07C 1/044 502/177 |
| 9,498,774 B2* | 11/2016 | Park | C07F 3/02 |
| 2002/0010221 A1* | 1/2002 | Ionkina | B01J 23/8896 518/715 |
| 2008/0286176 A1* | 11/2008 | Schirmeister | B01J 15/005 422/198 |
| 2012/0329889 A1 | 12/2012 | Yang et al. | |
| 2013/0210942 A1 | 8/2013 | Kibby et al. | |

FOREIGN PATENT DOCUMENTS

| | | | |
|---|---|---|---|
| KR | 10-2008-0060739 A | 7/2008 | |
| KR | 10-2009-0037089 A | 4/2009 | |
| KR | 10-0906095 B1 | 7/2009 | |
| KR | 10-1015492 B1 | 2/2011 | |
| KR | 10-1094077 B1 | 12/2011 | |
| KR | 10-1272082 B1 | 6/2013 | |
| KR | WO 2015060472 A1 * | 4/2015 | ............. B01J 23/75 |

* cited by examiner

COBALT-BASED CATALYST ON METAL STRUCTURE FOR SELECTIVE PRODUCTION OF SYNTHETIC OIL VIA FISCHER-TROPSCH REACTION, METHOD OF PREPARING THE SAME, AND METHOD OF SELECTIVELY PRODUCING SYNTHETIC OIL USING THE SAME

TECHNICAL FIELD

The present invention relates to a method of preparing a cobalt-based catalyst on a metal structure for selective production of synthetic oil via Fischer-Tropsch reaction, a cobalt-based catalyst prepared thereby and a method of selectively producing synthetic oil using the cobalt-based catalyst, and more particularly, to a catalyst technique wherein a metal structure is uniformly thinly spray-coated with a cobalt-based catalyst material to thus solve problems of heat generation during Fischer-Tropsch reaction, thereby increasing catalytic efficiency and selectively producing only synthetic oil without formation of wax.

BACKGROUND ART

Technology of producing a transportation synthetic oil such as gasoline or diesel from a gas mixture of hydrogen and carbon monoxide resulting from gasification of coal or reforming of natural gas is essential for compensating for the future depletion of oil reserves, and has been thoroughly developed based on the Fischer-Tropsch (F-T) reaction well-known from the 1920s.

Fischer-Tropsch reaction is carried out mainly using an iron- or cobalt-based catalyst. Although an iron-based catalyst has been initially mainly utilized, the use of a cobalt-based catalyst is currently preferable in order to increase production of liquid fuel or wax and to raise the conversion efficiency.

An iron-based catalyst is the most inexpensive among Fischer-Tropsch catalysts, and has low methane production at high temperature and high selectivity of olefin among hydrocarbons, and a product obtained thereby may be used not only as a fuel but also as a material for the chemical industry, such as light olefin or alpha-olefin. Furthermore, in addition to the hydrocarbons, large amounts of byproducts such as alcohols, aldehydes or ketones are formed. Moreover, a commercial low-temperature Fischer-Tropsch iron-based catalyst for main use in production of wax, available from Sasol, is manufactured via precipitation using a $SiO_2$ binder with the inclusion of copper (Cu) and potassium (K) as promoter components. Also, a high-temperature Fischer-Tropsch catalyst available from Sasol is manufactured by melting magnetite, K, alumina, and MgO.

On the other hand, a cobalt-based catalyst is undesirably expensive at over 200 times the price of the iron (Fe) catalyst, but is advantageous in terms of high activity, long lifetime, low $CO_2$ production and high liquid paraffin-based hydrocarbon production yield. However, this catalyst is problematic because $CH_4$ is produced in a large amount at high temperature, and is thus merely utilized as a low-temperature catalyst. Due to the use of expensive cobalt, it has to be well dispersed on a stable support having a large surface area such as alumina, silica or titania, and a precious metal promoter such as Pt, Ru or Re is further added in a small amount.

In regard to the Fischer-Tropsch synthesis reaction using a cobalt catalyst, U.S. Pat. No. 4,605,680 discloses preparation of a cobalt catalyst that is supported on γ-alumina or η-alumina and is activated with an oxide of Group IIIB or IVB metal, and U.S. Pat. No. 4,717,702 discloses preparation of a cobalt catalyst having high dispersibility of cobalt particles with a small particle size using an infiltration solution composed of an organic solvent.

Also, U.S. Pat. No. 6,130,184 discloses a cobalt catalyst having high activity via modification of a catalyst precursor and a carrier precursor, and U.S. Pat. Nos. 6,537,945 and 6,740,621 disclose catalysts having improved thermal stability and wear resistance, respectively.

In regard to the reactor for Fischer-Tropsch synthesis reaction, for a slurry reactor, U.S. Pat. Nos. 5,422,375 and 5,599,849 disclose an inner filter for catalyst separation and U.S. Pat. Nos. 5,157,054 and 5,348,982 disclose mixing of a reactant and a catalyst, and for a fixed-bed reactor, U.S. Pat. No. 6,211,255 discloses a fixed-bed reactor filled with a monolith catalyst to improve material transfer properties of a reactant and a product in the reactor, and Korean Patent Application Publication Nos. 2008-0060739 and 2009-0037089 disclose a fixed-bed reactor with a metal structure catalyst to improve material transfer properties and heat transfer properties in the reactor. Furthermore, U.S. Pat. No. 7,984,180 discloses a microchannel reactor using a cobalt catalyst for effective control of reaction heat.

However, the prior cobalt catalysts in powder or particle form as above make it very difficult to control the reaction temperature due to the severe exothermic reaction during Fischer-Tropsch synthesis reaction. Particularly upon reaction on a large scale, heat is excessively generated in the reactor and thereby the catalyst may become deactivated and also undesired side-reactions may occur.

With the goal of overcoming such problems, an inactive filler such as glass beads for preventing heat from excessively locally occurring is loaded in a reactor together with a catalyst in powder or pellet form, or any type of catalyst support including monolith or metal foam is utilized (M. Montes et al., Chemical Engineering Journal, 2011, 167, 536). Especially, when a metal foam structure in a three-dimensional shape is used as a support for a catalyst powder, it may exhibit high thermal conductivity compared to glass beads or other metal oxide beads, and may thus easily transfer heat generated in the catalyst bed during the reaction, and is also favorable for diffusion of a reactive gas to the catalyst. Conventional coating techniques of metal foam with catalyst particles are limited to wash-coating or dip-coating in such a manner that a series of procedures of immersing a metal foam in a prepared catalyst sol, taking it out of the sol and then drying it are repeated.

However, such conventional catalyst preparation methods are disadvantageous because the catalyst coating is still thick and thus problems of deactivation of the catalyst due to heat generated upon Fischer-Tropsch reaction and undesired side-reaction problems cannot be basically solved.

Attributed to difficulties in the temperature control in the reactor, a variety of products including gas products such as $CH_4$, $CO_2$, etc., and liquid products such as gasoline, diesel and wax may result, making it difficult to achieve selective production. Specifically, when a cobalt-based catalyst is used for Fischer-Tropsch synthesis reaction, a hydrocarbon having a long chain with 20 or more carbon atoms, namely, a wax material, may be formed. For this reason, a synthetic fuel such as wax manufactured via the Fischer-Tropsch reaction cannot be directly used as a commercial fuel for vehicles, and thus has to be converted into a commercial fuel such as diesel, which is undesirable.

Hence, there is required a direct production process that is able to selectively produce a synthetic oil such as liquid gasoline or diesel without formation of wax after Fischer-Tropsch reaction.

CITATION LIST (Patent Document 1) Korean Patent No. 10-0906095 (2009 Jun. 29.)
(Patent Document 2) Korean Patent No. 10-1272082 (2013 May 31.)
(Patent Document 3) Korean Patent No. 10-1015492 (2011 Feb. 10.)
(Patent Document 4) Korean Patent No. 10-1094077 (2011 Dec. 8.)

DISCLOSURE

Technical Problem

Accordingly, the present invention has been made keeping in mind the problems encountered in the related art, and an object of the present invention is to provide a cobalt-based catalyst on a metal structure for selective production of synthetic oil, a method of preparing the same, and a selectively producing synthetic oil using the same, wherein zeolite, cobalt and a support may be mixed and ground to give a catalyst sol, which is then uniformly thinly applied on the surface of a metal structure using a spray-coating process, thereby preventing generation of heat during Fischer-Tropsch reaction and selectively producing a synthetic oil having a carbon chain shorter than that of wax.

Technical Solution

In order to accomplish the above object and to overcome the prior problems, an aspect of the present invention provides a method of preparing a cobalt-based catalyst on a metal structure for selective production of synthetic oil via Fischer-Tropsch reaction, comprising: burning a powder mixture obtained by melt infiltration of a cobalt hydrate and a metal oxide support to give a catalyst powder comprising cobalt oxide/metal oxide support; hybridizing the catalyst powder comprising cobalt oxide/metal oxide support with a zeolite powder to give a hybrid catalyst powder; mixing the hybrid catalyst powder with an organic binder and an inorganic binder and grinding the mixed hybrid catalyst powder to give a hybrid catalyst sol; spray-coating a metal structure surface-treated with alumina by atomic layer deposition with the hybrid catalyst sol; and thermally treating the metal structure spray-coated with the hybrid catalyst sol.

In a preferred embodiment, mixing the hybrid catalyst powder with the organic binder and the inorganic binder and grinding the mixed hybrid catalyst powder to give the hybrid catalyst sol may comprise preparing a hybrid catalyst sol further including ruthenium (Ru).

In a preferred embodiment, the cobalt hydrate may be any one selected from among $Co(NO_3)_2 6H_2O$ (m.p.=55° C.), $CoCl_2 6H_2O$ (m.p.=86° C.), and $CoSO_4 7H_2O$ (m.p.=96.8° C.).

In a preferred embodiment, the cobalt oxide may be loaded in an amount of 15~40 wt % based on the total weight of the catalyst comprising the metal oxide support that is thermally decomposed at high temperature after infiltration.

In a preferred embodiment, the metal oxide support may be porous silica or alumina having a pore volume of 0.4 $cm^3/g$ or more and an effective surface area of 100 $m^2/g$ or more.

In a preferred embodiment, the burning may be performed by thermal treatment at 300~500° C. in the atmosphere, thus obtaining cobalt oxide particles having a size of 5~50 nm.

In a preferred embodiment, the melt infiltration may be performed for 1~48 hr in a closed system at a temperature 2~5° C. higher than a melting point of the cobalt hydrate.

In a preferred embodiment, the zeolite may be added such that an amount thereof is 5~30 wt % based on the total weight of the hybrid catalyst.

In a preferred embodiment, the hybrid catalyst sol may be prepared in such a manner that the hybrid catalyst powder is added in an amount of 1~10 wt % to a dispersion solution comprising the organic binder, the inorganic binder and a solvent mixture of distilled water and ethanol, ground to a size of 900 nm or less and dispersed.

In a preferred embodiment, the organic binder may be PVB (Polyvinyl butyral), PVP (Polyvinylpyrrolidone) or PVA (Polyvinyl alcohol), and the inorganic binder may be alumina sol or silica sol.

In a preferred embodiment, the metal structure may comprise nickel, copper or a combination of nickel and copper, with a pore size of 1.2~0.45 mm.

In a preferred embodiment, the atomic layer deposition may be performed a total of 60~100 cycles at a substrate temperature of 120° C. so that alumina has a thickness of 12~20 nm.

In a preferred embodiment, the hybrid catalyst sol may be sprayed on the metal structure at a rate of 1~10 mL/sec upon spray-coating, so that an amount of the loaded hybrid catalyst sol per an area of the metal structure is 4~40 $mg/cm^2$.

In a preferred embodiment, the temperature of a support plate for supporting the bottom of the metal structure may be maintained at 40~90° C.

In a preferred embodiment, Ru may be contained in an amount of 1~5 wt % based on the total weight of a catalyst comprising cobalt oxide/Ru/metal oxide support obtained by dissolving a Ru salt in a hybrid catalyst sol solution, coating the metal structure with the hybrid catalyst sol, and performing burning and thermal treatment to result in decomposition.

Another aspect of the present invention provides a cobalt-based catalyst on a metal structure for selective production of synthetic oil via Fischer-Tropsch reaction, prepared by the method as above.

A further aspect of the present invention provides a method of selectively producing synthetic oil using a cobalt-based catalyst on a metal structure via Fischer-Tropsch reaction, comprising: reacting the cobalt-based catalyst as above with a synthetic gas comprising carbon monoxide and hydrogen at a volume ratio of 1:2 in a reactor, thus producing a $C_{5-12}$ synthetic oil without formation of wax.

In a preferred embodiment, the synthetic gas may be fed into the reactor at a space velocity of 1.0~9.0 $NL/g_{cat}/hr$, and the reacting may be performed at 240~280° C.

According to the present invention, as a cobalt-based catalyst on a metal structure is configured such that the metal structure is uniformly thinly spray-coated with zeolite-hybridized cobalt, it is effective at selectively producing only oil without formation of wax via Fischer-Tropsch synthesis reaction, and has high activity and stability.

Also, the catalyst of the invention uniformly thinly applied on the metal structure using a spray-coating process can rapidly transfer heat generated during Fischer-Tropsch reaction, and is thus very efficiently applied to the scale-up of a reactor.

Furthermore, when the cobalt-based catalyst uniformly thinly applied on the metal structure using a spray-coating process further includes Ru, performance thereof can be further enhanced, thus achieving higher reactivity.

Such a catalyst structure is easy in terms of catalyst separation after the reaction and can be re-used semi-permanently, thus being convenient and generating economic benefits, compared to a pellet catalyst.

When the catalyst according to the present invention having the advantages as above is employed in commercial processes using Fischer-Tropsch reaction, synthetic oil can be profitably selectively produced, and therefore, the industrial applicability thereof is expected to increase.

MODE FOR INVENTION

Hereinafter, a detailed description will be given of constructions and functions according to embodiments of the present invention taken in conjunction with the accompanying drawings. In the following description, it is to be noted that, when known techniques related with the present invention may make the gist of the present invention unclear, a detailed description thereof will be omitted.

Figure 1:
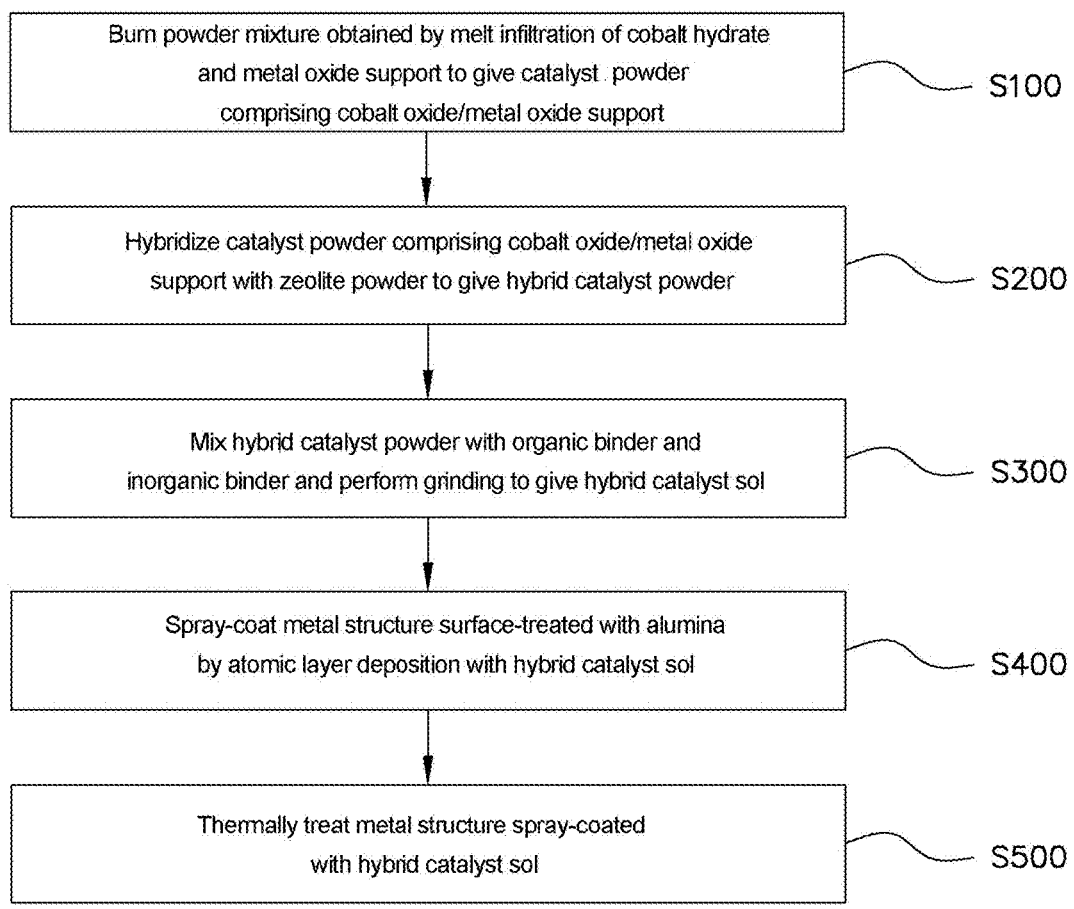
FIG. 1 illustrates a process of synthesizing a hybrid catalyst comprising cobalt oxide/metal oxide support/zeolite on a metal structure for production of synthetic oil according to an embodiment of the present invention.
Figure 2:
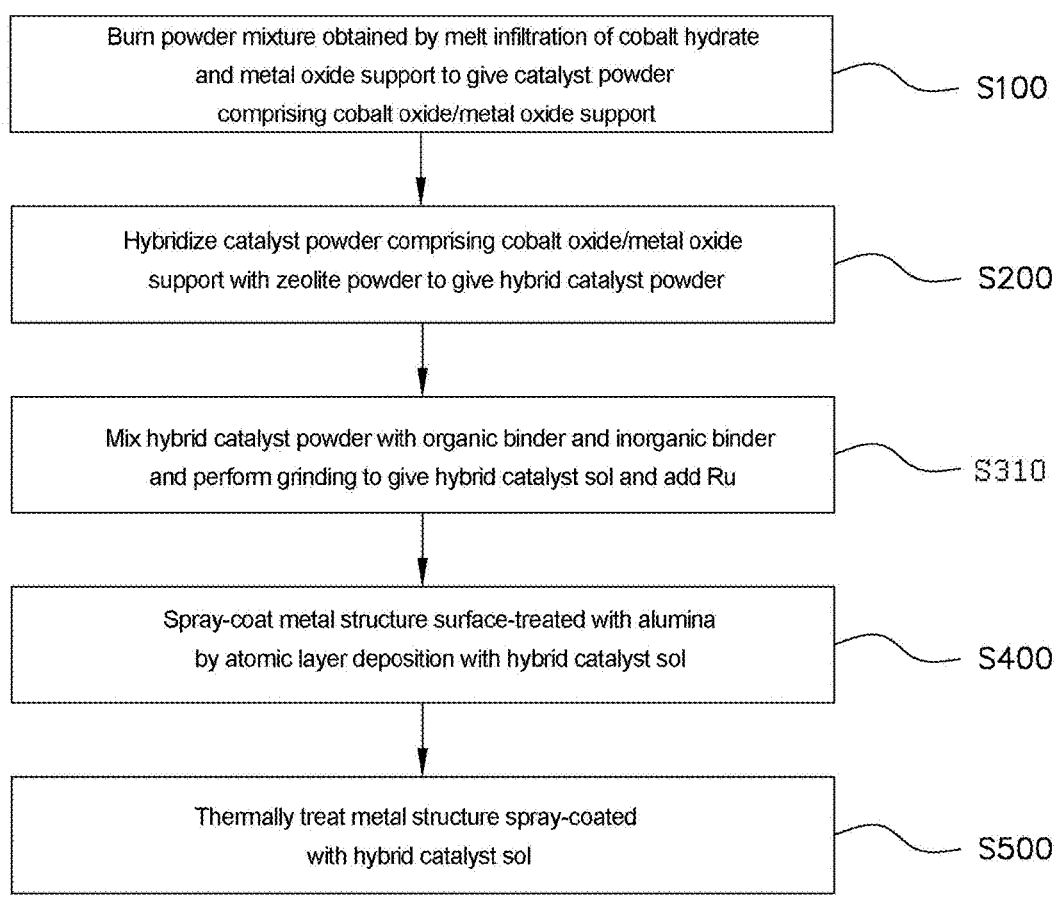
FIG. 2 illustrates a process of synthesizing a hybrid catalyst comprising cobalt oxide/Ru/metal oxide support/zeolite on a metal structure for production of synthetic oil according to another embodiment of the present invention.

FIG. 1 illustrates a process of synthesizing a hybrid catalyst comprising cobalt oxide/metal oxide support/zeolite on a metal structure for production of synthetic oil according to an embodiment of the present invention, and FIG. 2 illustrates a process of synthesizing a hybrid catalyst comprising cobalt oxide/Ru/metal oxide support/zeolite on a metal structure for production of synthetic oil according to another embodiment of the present invention.

The present invention addresses a method of preparing a catalyst, which may selectively produce synthetic oil without formation of wax while achieving low heat generation upon Fischer-Tropsch synthesis reaction to produce a transportation (commercial) synthetic oil from a gas mixture of carbon monoxide and hydrogen, wherein a metal structure (foam) is utilized as a medium for rapid heat transfer of catalyst powder particles and as a support for preventing pressure-drop of a reactant, and such a metal structure is uniformly thinly spray-coated with a hybrid catalyst sol as a catalyst material. This method includes: burning a powder mixture formed by melt infiltration of a cobalt hydrate and a metal oxide support to give a catalyst powder comprising cobalt oxide/metal oxide support (S100); hybridizing the catalyst powder comprising cobalt oxide/metal oxide support with a zeolite powder to give a hybrid catalyst powder (S200); mixing the hybrid catalyst powder with an organic binder and an inorganic binder and then grinding the mixed hybrid catalyst powder to give a hybrid catalyst sol (S300);

spray-coating a metal structure surface-treated with alumina by atomic layer deposition with the hybrid catalyst sol (S400); and thermally treating the metal structure spray-coated with the hybrid catalyst sol (S500).

As such, mixing the hybrid catalyst powder with the organic and inorganic binders and then grinding the mixed hybrid catalyst powder to give the hybrid catalyst sol may include preparing a hybrid catalyst sol further comprising Ru (S310).

Specifically, the hybrid catalyst powder comprising cobalt oxide/metal oxide support/zeolite according to the present invention is prepared using melt infiltration that is favorable in mass production and efficient dispersion of active particles, compared to a conventional incipient wetness method.

For the initial catalyst powder comprising cobalt oxide/metal oxide support for use in a spray-coating process according to the present invention, a basic catalyst comprising cobalt/metal oxide support may be prepared by melt infiltration that is simple and favorable in mass production.

The cobalt hydrate useful in preparation of the cobalt oxide powder using melt infiltration may be any one selected from $Co(NO_3)_2 6H_2O$ (m.p.=55° C.), $CoCl_2 6H_2O$ (m.p.=86° C.), and $CoSO_4 7H_2O$ (m.p.=96.8° C.), each having a melting point of 100° C. or less but exceeding room temperature. The temperature for melt infiltration may depend on the melting point of the metal salt, and may be more accurately determined via DSC (Differential Scanning calorimeter) or using a melting point analyzer.

The metal oxide support, which may be typically used together with the cobalt hydrate, may be porous silica or alumina having a pore volume of 0.4 cm$^3$/g or more and an effective surface area of 100 m$^2$/g or more (Table 1).

TABLE 1

| Silica support | Pore Volume (cm$^3$/g) | BET SSA (m$^2$/g) | Pore Size (nm) |
| --- | --- | --- | --- |
| SBA-15 | 1.0 | ~600 | 9 |
| KIT-6 |  | 600~800 | 4.3~6.2 |
| HMS (wormhole) | 1.76 | ~910 | 3.9 |
| MSU-F | 2.31 | ~562 |  |
| MCM-41 | 0.98 | ~1000 | 2.1~2.7 |
| MSU-H | 0.91 | ~750 | ~7.1 |
| FDU-12 | 0.66 | ~600 | 10 |

Pore and Surface Area Properties of Various Porous Silica Supports

Figure 3:
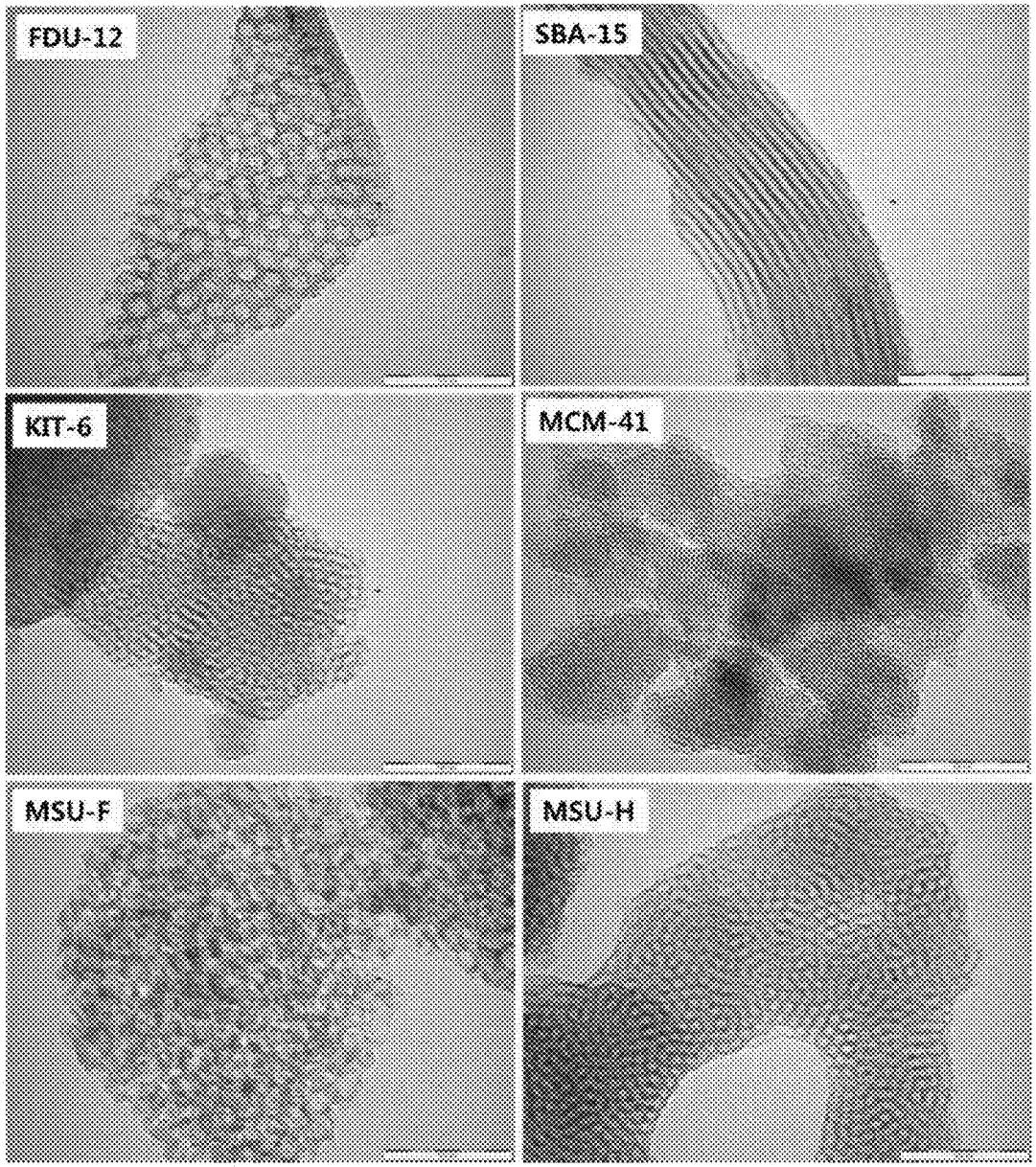
FIG. 3 illustrates transmission electron microscope (TEM) images of various porous silica supports according to the present invention.

Useful as the metal oxide support of the cobalt catalyst particles, silica may include any porous silica, especially a material having large pores made by a sol-gel process of a silica precursor such as TEOS (Tetraethyl orthosilicate) or TMOS (Tetramethyl orthosilicate) using a polymer surfactant (Pluronic F127, Pluronic P123, Triton-X, etc.) as a template. Examples of synthetic mesoporous silica may include SBA-1, SBA-15, SBA-16, KIT-6, MCM-48, MCF (mesocellular siliceous foam), and MSU (FIG. 3).

Depending on the pore volume of the metal oxide support, the cobalt catalyst particles may be variously loaded in the amount range of 5~70 wt %, and in order to ensure catalytic reactivity and dispersibility of the loaded cobalt particles, the amount of the metal particles loaded on the support is preferably set to 15~40 wt % based on the total weight of the catalyst comprising catalyst particles/support after high-temperature thermal decomposition of the melt-infiltrated composite.

When the metal oxide support such as silica or alumina that is melt-infiltrated with the cobalt hydrate is burned at high temperature in the atmosphere, it is possible to obtain cobalt oxide particles having any size ranging from 5 to 50 nm depending on the kind of metal oxide support and the amount of salt due to the decomposition of the loaded cobalt hydrate.

The infiltration with the cobalt hydrate may be performed at a temperature about 2~5° C. higher than the melting point of the salt so that the support may be completely infiltrated with the salt, and the reaction has to be carried out in a closed system to prevent disappearance of pressure due to vapor pressure generated during the reaction. The reaction time is preferably set to about 1~48 hr so that the salt is sufficiently dissolved to infiltrate the support therewith.

The powder obtained by drying at room temperature after infiltration is thermally treated at high temperature in the atmosphere so as to decompose the salt. As such, the thermal treatment temperature may be set to 300~500° C. If this temperature is lower than 300° C., the salt may not be completely decomposed. In contrast, if it is higher than 500° C., sintering of the cobalt oxide particles may partially occur.

Subsequently, the catalyst powder comprising cobalt oxide/metal oxide support is further hybridized with a zeolite powder, thus obtaining the hybrid catalyst powder.

The reason why zeolite is hybridized at an appropriate proportion with the cobalt catalyst is that a gasoline material ($C_5$-$C_{12}$) having a comparatively short carbon chain may be selectively obtained. This is because hydrocracking is created together by the acid catalyst zeolite upon Fischer-Tropsch synthesis reaction and thus growth of a hydrocarbon chain is limited somewhat.

The amount of hybridized zeolite is preferably set to 5~30 wt % based on the total weight of the hybrid catalyst. If the amount of added zeolite is less than 5 wt %, hydrocracking of zeolite may become insignificant, and thus wax may be partially produced. In contrast, if the amount thereof exceeds 30 wt %, undesired methanation may accelerate, thus producing a large amount of methane. Such zeolite is exemplified by ZSM-5 that is known to have good acid catalyst properties among various zeolite catalysts.

Addition of zeolite may be performed by simply mixing and grinding zeolite and the catalyst comprising cobalt/metal oxide (alumina or silica) using a pestle, or by means of a specific mixer (Noblita-130, Hosokawa).

Then, a catalyst sol solution that was previously dispersed well is required to efficiently spray-coat the metal structure (foam) with the hybrid catalyst powder. To this end, an Ultra Apex Mill is used as a grinding and dispersion device, so that the hybrid catalyst powder particles having a size of tens of micrometer are ground to a size of 900 nm or less and dispersed. The hybrid catalyst powder includes an organic binder and an inorganic binder so as to efficiently bind the hybrid catalyst particles to the coated metal structure (foam), giving a catalyst sol. The organic binder may include any one selected from among polymer materials such as PVB (Polyvinyl butyral), PVP (Polyvinylpyrrolidone) and PVA (Polyvinyl alcohol), and the inorganic binder may include alumina sol or silica sol. The hybrid catalyst powder including zeolite is added in an amount of 1~10 wt % to a dispersion solution obtained by adding the organic binder and the inorganic binder to a prepared solvent mixture of distilled water and ethanol, in order to efficiently coat the metal structure (foam) therewith. If the amount of the hybrid catalyst powder exceeds 10 wt % based on the total catalyst sol, a grinding effect by an Ultra Apex Mill may deteriorate and thus the particles may excessively increase. In contrast, if the amount thereof is less than 1 wt % and thus the catalyst is too dilute, the use of the solvent in a large amount may result in a longer grinding time. After grinding/dispersion, the catalyst colloid particles preferably have a size of 900 nm or less to ensure high sol dispersibility and resistance to settlement.

For high dispersion of the hybrid catalyst sol comprising cobalt oxide and zeolite, zirconia beads may be used upon grinding the catalyst particles using an Ultra Apex Mill, and may have a size of 0.3 to 0.03 mm, depending on the desired particle size. The grinding time may be set to the range of 30 min to 4 hr so as to sufficiently grind large particles. If the grinding time is less than 30 min, the particles are not completely ground. In contrast, if the grinding time is longer than 4 hr, the ground particles are not decreased anymore and may rather agglomerate, undesirably deteriorating the particle size distribution. The use of a rotor operating at 3,000~6,000 rpm is very effective at grinding the particles.

In addition, as illustrated in FIG. 2 according to another embodiment of the present invention, Ru may be further added to enhance performance of the catalyst comprising cobalt oxide/porous support/zeolite. Ru is a promoter for increasing activity of the cobalt-based catalyst. Ru is added in such a manner that, for the sake of preparation of the catalyst, a predetermined amount of Ru salt is dissolved in a hybrid catalyst sol solution and the resulting hybrid catalyst sol is then applied on a metal structure, followed by thermal treatment to result in decomposition. Specifically, when Ru is utilized as a promoter, any one selected from among $RuCl_3$, $RuI_3$, $RuBr_3$ and $RuCl_3 xH_2O$ may be dissolved in a desired amount in the sol solution, after which the resulting sol may be applied and thermally treated to result in decomposition.

As such, Ru may be added in an amount of 1~5 wt % based on the total weight of the catalyst comprising cobalt/metal oxide except for the metal foam structure. If the amount of Ru is less than 1 wt %, catalytic activity may become insignificant. In contrast, if the amount thereof exceeds 5 wt %, the extent of improvement of performance may become insignificant, and the preparation cost may increase.

The metal structure may include nickel, copper or a combination of nickel and copper, having high thermal conductivity, flexibility and processability. The pore size of the metal structure (foam) falls in the range of 1.2 to 0.45 mm. To attain good catalytic activity, a metal foam having 0.45 mm sized pores with a larger surface area is preferably used, and a metal structure (foam) having 1.2 mm sized pores may be utilized to ensure high loading of a catalyst powder.

The surface of the metal structure (foam) is subjected to atomic layer deposition (ALD) so as to be efficiently coated with a nano-sized alumina film, thereby enhancing bondability between the hybrid catalyst particles and the surface of the metal structure. Furthermore, the metal structure (foam) coated with the hybrid catalyst particles is thermally treated at high temperature so that the catalyst particles are not detached in the form of a powder lump in a large amount from the surface of the metal structure (foam) but are firmly attached thereto.

Specifically, the surface of the metal structure undergoes ALD with alumina to increase affinity to the cobalt particles loaded on the metal oxide support so as to enhance bonding strength. ALD is conducted a total of 60~100 cycles at a substrate temperature of about 120° C. Since alumina is applied to a thickness of about 0.2 nm per cycle, alumina has a final thickness of 12~20 nm by the total surface treatment, which is regarded as appropriate in terms of thermal conductivity or bondability.

The hybrid catalyst sol may be sprayed at a rate of 1~10 mL/sec to attain a uniform coating, so that the metal structure (foam) may be spray-coated therewith. If the catalyst sol is sprayed at a rate less than 1 mL/sec, an excessively long time period may be required to apply the catalyst in a desired amount. In contrast, if the catalyst sol is sprayed at a rate exceeding 10 mL/sec, a large amount of catalyst sol may be discharged at once and the solution in an excessively large amount may be applied on the metal plate, undesirably clogging pores or obtaining a non-uniform coating.

The metal structure may be processed so as to have desired size and shape. When the coating process is performed under the condition that the temperature of a support plate for supporting the bottom of the metal structure is maintained at 40~90° C., the sprayed catalyst sol may be favorably rapidly dried.

As such, the amount of the loaded hybrid catalyst sol per the area of the metal structure may be 4~40 $mg/cm^2$. If the amount of the hybrid catalyst sol is less than 4 $mg/cm^2$, catalytic reactivity may become insignificant. In contrast, if the amount thereof exceeds 40 $mg/cm^2$, reactivity relative to the amount of added catalyst may become poor.

The metal structure (foam) coated with the hybrid catalyst sol and then dried at room temperature may be burned in a high-temperature burner at 400° C., ultimately enhancing bondability between the catalyst and the metal structure.

Immediately after the cobalt-based catalyst configured such that the metal structure (foam) is coated with the hybrid catalyst powder comprising finely ground cobalt oxide/metal oxide support/zeolite particles or further comprising Ru is placed in a tube fixed-bed reactor, a synthetic gas is fed into the reactor, so that synthetic oil is obtained via Fischer-Tropsch synthesis reaction.

Below is a description of a method of producing synthetic oil using Fischer-Tropsch synthesis reaction according to the present invention.

Useful in the present invention, the synthetic gas may be a material comprising carbon monoxide and hydrogen at a volume ratio of 1:2.

Also, the synthetic gas is preferably fed into a tube fixed-bed reactor at a space velocity of 1.0~9.0 $NL/g_{cat}/hr$. If the space velocity is less than the above lower limit, the reaction may be carried out but liquid hydrocarbon productivity per unit time may decrease. In contrast, if the space velocity exceeds the upper limit, the carbon monoxide conversion may decrease.

The reaction temperature may be set to 200~300° C. and is preferably in the range of 240~280° C. to increase the carbon monoxide conversion and the synthetic oil yield.

According to the present invention, the Fischer-Tropsch synthesis reaction using the catalyst configured such that the metal foam is coated with the hybrid catalyst comprising cobalt oxide/alumina/zeolite or further comprising Ru in a small amount may result in high reactivity, low wax productivity and high $C_{5-12}$ liquid hydrocarbon productivity. Hence, the catalyst of the invention for production of synthetic oil may be efficiently applied to commercial processes.

A better understanding of the present invention may be obtained via the following examples and comparative examples, which are set forth to illustrate but are not to be construed as limiting the present invention.

EXAMPLE 1

Preparation of Cobalt Oxide Catalyst on Alumina Support and Hybridization with Zeolite 4.358 g of $Co(NO_3)_2 6H_2O$ (m.p.=55° C.) and 5 g of γ-alumina (STREM CHEMICALS, INC., surface area=185 $m^2/g$, pore volume=0.43 $cm^3/g$) were placed in a mortar and sufficiently ground using a pestle until a uniform color was obtained.

Subsequently, a pink powder mixture was placed in a polypropylene bottle, and the bottle was allowed to stand in an oven at 60° C. for 24 hr.

After 24 hr, the powder mixture was cooled to room temperature and then burned in a burning oven at 400° C. for 4 hr in the atmosphere, thus obtaining a catalyst comprising cobalt oxide, namely, $Co_3O_4$ particles loaded in 15 wt % on alumina.

Figure 4:
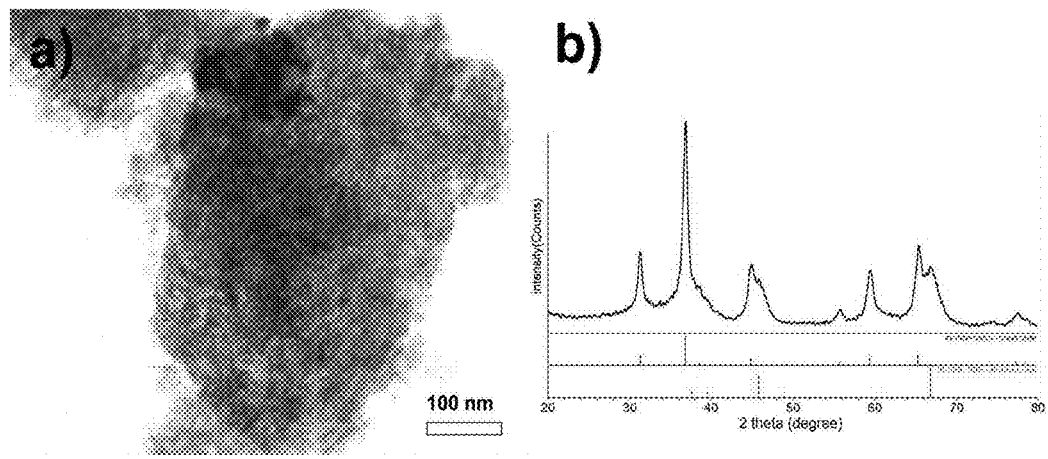
FIGS. 4(a) and 4(b) illustrate a TEM image and an X-ray diffraction (XRD) spectrum, respectively, of cobalt oxide particles on γ-alumina of Example 1 according to the present invention.

In the TEM image of FIG. 4(a), the cobalt particles and the γ-alumina were analyzed, and the catalyst was analyzed to be composed mainly of $Co_3O_4$ (JCPDSNo. 43-1003) and γ-$Al_2O_3$ (JCPDSNo. 01-1303) via XRD of FIG. 4(b).

4.0 g of the obtained $Co_3O_4$/alumina powder was efficiently hybridized with 1 g of MFI zeolite (ZSM-5, CBV2314, zeolyst, BET SSA=425 $m^2/g$) using a powder mixer (Nano Particle Composing System, Noblita-130, Hosokawa).

EXAMPLE 2

Preparation of Cobalt Oxide/Zeolite Catalyst Having High Loading of Cobalt in 30 wt % or More on Silica Support 20.2 g of $Co(NO_3)_2 6H_2O$ (m.p.=55° C.) and 5 g of a porous silica support MSU-F (Aldrich, Silica, mesostructured, cellular foam) were placed in a mortar and sufficiently ground using a pestle until a uniform color was obtained.

Subsequently, a pink powder mixture was placed in a polypropylene bottle, and the bottle was allowed to stand in an oven at 60° C. for 24 hr.

After 24 hr, the powder mixture was cooled to room temperature and then burned in a burning oven at 400° C. for 4 hr in the atmosphere, thus obtaining a catalyst comprising cobalt oxide, namely, $Co_3O_4$ particles on silica.

Figure 5:
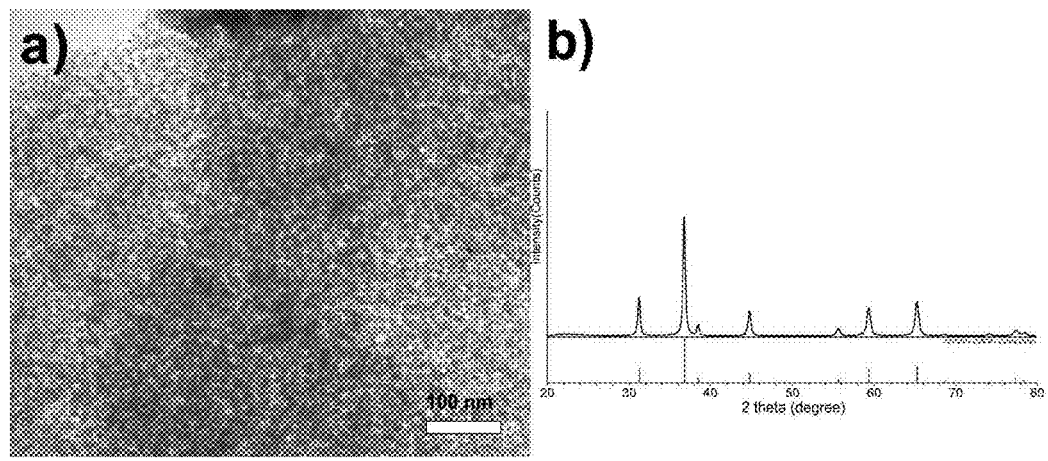
FIGS. 5(a) and 5(b) illustrate a TEM image and an XRD spectrum, respectively, of highly loaded cobalt oxide particles on porous silica MSU-F of Example 2 according to the present invention.

As illustrated in FIG. 5(a), small particles having a size of 10~20 nm were densely loaded on the porous silica support. As illustrated in FIG. 5(b), the crystal phase thereof was analyzed to be composed exclusively of $Co_3O_4$ (JCPDSNo. 43-1003) via XRD.

8.0 g of the obtained $Co_3O_4$/MSU-F catalyst and 2 g of MFI zeolite (ZSM-5, CBV2314, zeolyst, BET SSA=425 $m^2/g$) were placed in a mortar and sufficiently ground using a pestle until a uniform color was obtained, finally obtaining a catalyst having high loading of $Co_3O_4$ particles in 36 wt % on silica and zeolite.

EXAMPLE 3

Preparation of Cobalt Oxide/Silica Catalyst Sol Hybridized with Zeolite and Grinding/Dispersion Thereof 10 g of the $Co_3O_4$/MSU-F/ZSM-5 catalyst obtained in Example 2 was added to a solution of 10 g of an organic binder PVP (Aldrich, Polyvinylpyrrolidone, Mw=55,000, Mn=111.14 g/mol), 10 g of Nissan Alumina sol as an inorganic binder (AS-200, $Al_2O_3$=10 wt %), 100 g of distilled water and 400 g of ethanol.

The solution including the catalyst powder was dispersed well using an Ultra Apex Mill (UAM-015; Kotobuki Industries Co. Ltd, Japan). The size of zirconia beads used for grinding was 0.3 mm and the grinding/dispersion time was 2 hr. The rotor was rotated at 4,000 rpm.

Figure 6:
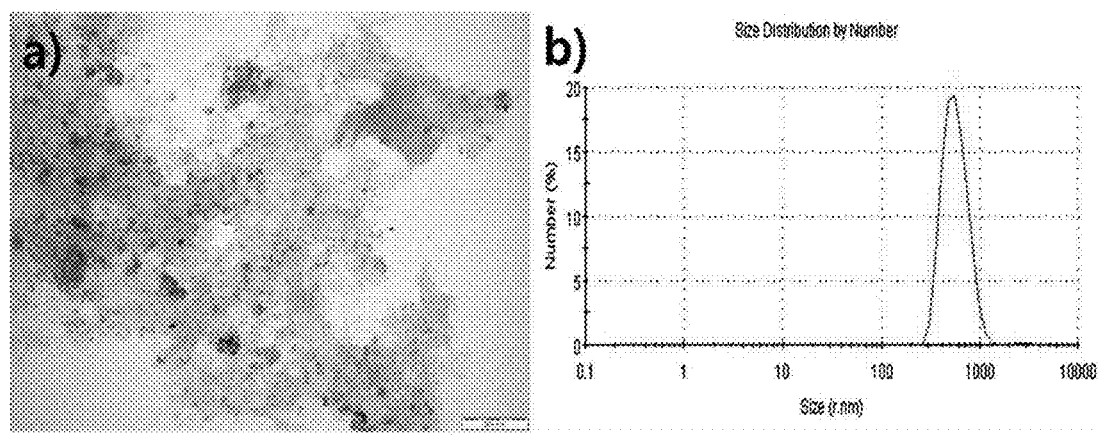
FIGS. 6(a) and 6(b) illustrate a TEM image and a particle size distribution, respectively, of a ground catalyst comprising cobalt oxide/silica/zeolite of Example 3 according to the present invention.

The resulting sol had high dispersion of the solution. As illustrated in the TEM image of FIG. 6(a), the shape of the ground structure was confirmed. Based on the results of analysis of particle size after the grinding process, most of the particles were measured to have a size of about 700 nm as illustrated in FIG. 6(b).

EXAMPLE 4

Preparation of Cobalt Oxide/Silica Catalyst on Nickel Structure (Foam)

Figure 7:
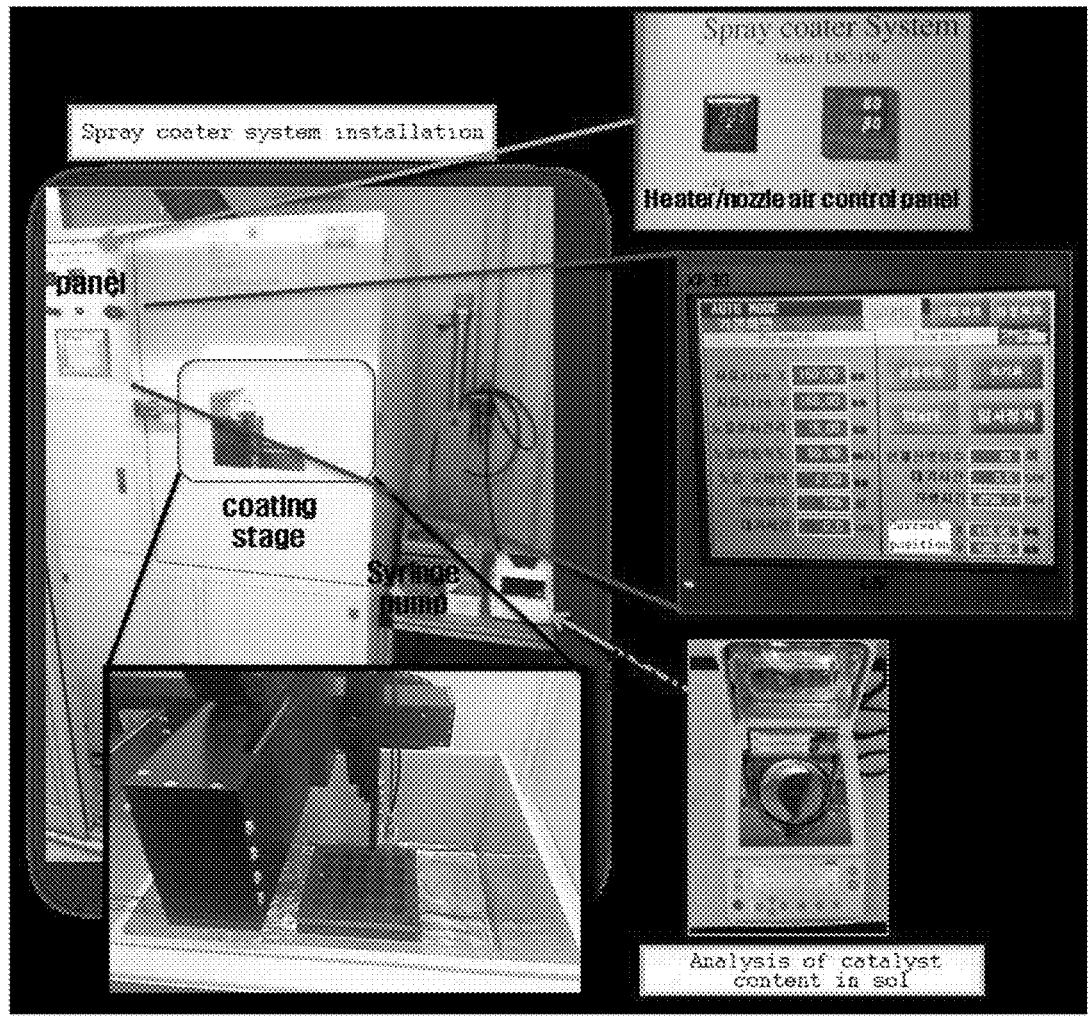
FIG. 7 illustrates a spray coater system for use in a coating process in Example 4 according to the present invention.

The hybrid catalyst sol of Example 3 was sprayed at a rate of 5 mL/min using a special spray coater. The spray coater is a system for finely spraying a catalyst sol using a spray nozzle so that the catalyst sol is applied to a predetermined thickness on a metal structure (foam) such as nickel or copper, and is configured such that a heater is provided in a sample chuck to facilitate drying of the sprayed catalyst sol so as for a plurality of rapid coating operations and thus the heated sample is coated. As illustrated in FIG. 7, a controller includes a touch screen where operation and robot set values are input. The coating process was performed while the jig of the nozzle was moved in a zigzag form at a preset rate. To measure the accurate amount of the catalyst in the catalyst sol, a solid content analyzer (UniBloc Moisture Analyzer MOC63u, SHIMADZU) was used.

The nickel structure (foam) was previously treated with alumina by ALD to increase affinity to the cobalt/MSU-F catalyst particles in order to enhance bonding strength after the coating process. ALD was performed a total of 80 cycles at a substrate temperature of about 120° C., so that an alumina coating about 16 nm thick was formed.

For a uniform coating process with the catalyst sol, 1 L of the solution was divided into two and 500 mL each were sprayed on the front and the rear of the nickel structure (foam) for 3 hr 20 min, and the temperature of the heater of the sample chuck was set to 80° C. so as for efficient drying and rapid coating.

EXAMPLE 5

Preparation of Cobalt Oxide/Ru/Silica Catalyst on Nickel Structure (Foam)

0.4 g of $RuCl_3$ (Aldrich, fw=207.43 g/mol) was dissolved in the hybrid catalyst sol of Example 3. The catalyst sol including Ru was sprayed on a metal structure (foam) at a rate of 5 mL/min using a spray coater.

The nickel structure (foam) was previously treated with alumina by ALD to increase affinity to the cobalt oxide/MSU-F catalyst particles in order to enhance bonding strength after the coating process. ALD was performed a total of 80 cycles at a substrate temperature of about 120° C., so that an alumina coating about 16 nm thick was formed.

Figure 8:
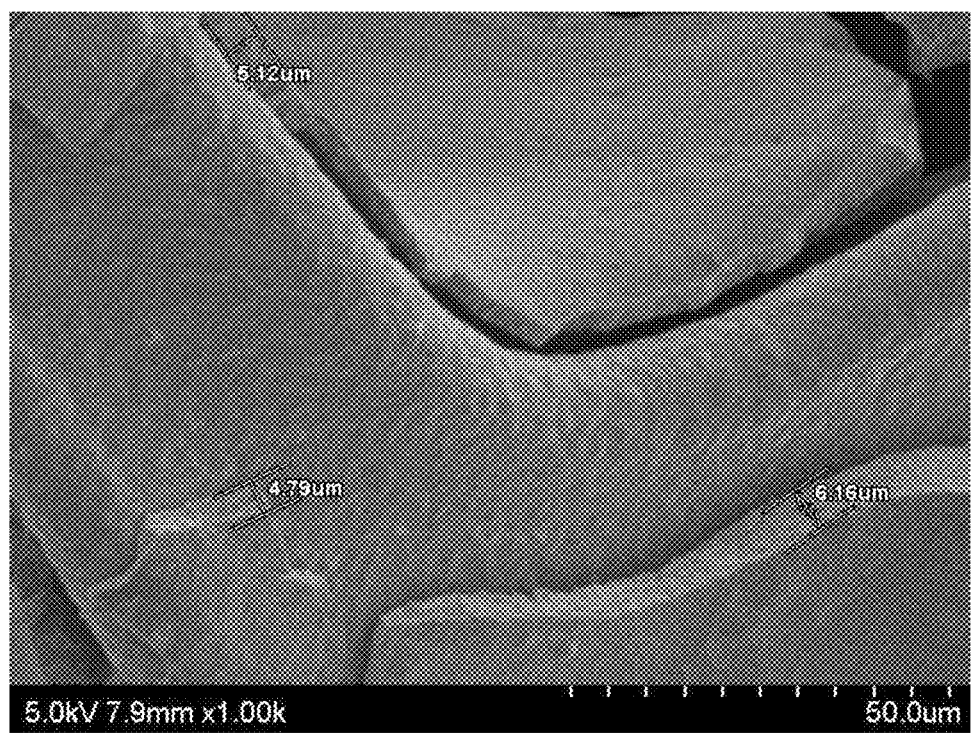
FIG. 8 illustrates a scanning electron microscope (SEM) image of cobalt oxide/Ru/zeolite on a nickel foam structure of Example 5 according to the present invention.

For a uniform coating process with the hybrid catalyst sol, 1 L of the solution was divided into two and 500 mL each were sprayed on the front and the rear of the nickel structure (foam) for 3 hr 20 min, and the temperature of the heater of the sample chuck was set to 80° C. so as for efficient drying and rapid coating. The dried catalyst coating was thermally treated at 400° C. for 4 hr in the atmosphere. FIG. 8 illustrates an SEM image of the catalyst particles applied on the nickel structure (foam) after thermal treatment, wherein the coating thickness is about 5 μm.

EXAMPLE 6

Production of Synthetic Oil Using Pellet Catalyst Comprising Cobalt/Alumina/Zeolite A fixed-bed reactor was used, and the reaction procedure was controlled using an automated system operable by PC (personal computer). Specifically, a powder catalyst was pelletized to a pellet form having a size of 0.3~0.6 mm using a metal sieve to achieve efficient catalyst loading so as to prevent pressure-drop during the reaction. Then, 4.5 g of the pellet catalyst comprising $Co_3O_4/Al_2O_3$/ZSM-5 (Co: 12 wt %, zeolite: 20 wt %) of Example 2 was mixed with 9.0 g of glass beads having a diameter of 0.2 mm at a ratio of 1:2 and then loaded into the bottom of a tube reactor made of SUS material with an inner diameter of 1 inch.

The loaded catalyst was reduced at 400° C. for 16 hr while hydrogen gas was allowed to flow into the reactor. Then, the catalyst reduced into metal cobalt was subjected to Fischer-Tropsch reaction at 270° C. for 24 hr under the reaction conditions of hydrogen to carbon monoxide at a volume ratio of 2:1, GHSV (gas hourly space velocity) of 2.0 $NL/g_{cat}$-h, and a pressure of 20 atm.

Figure 9:
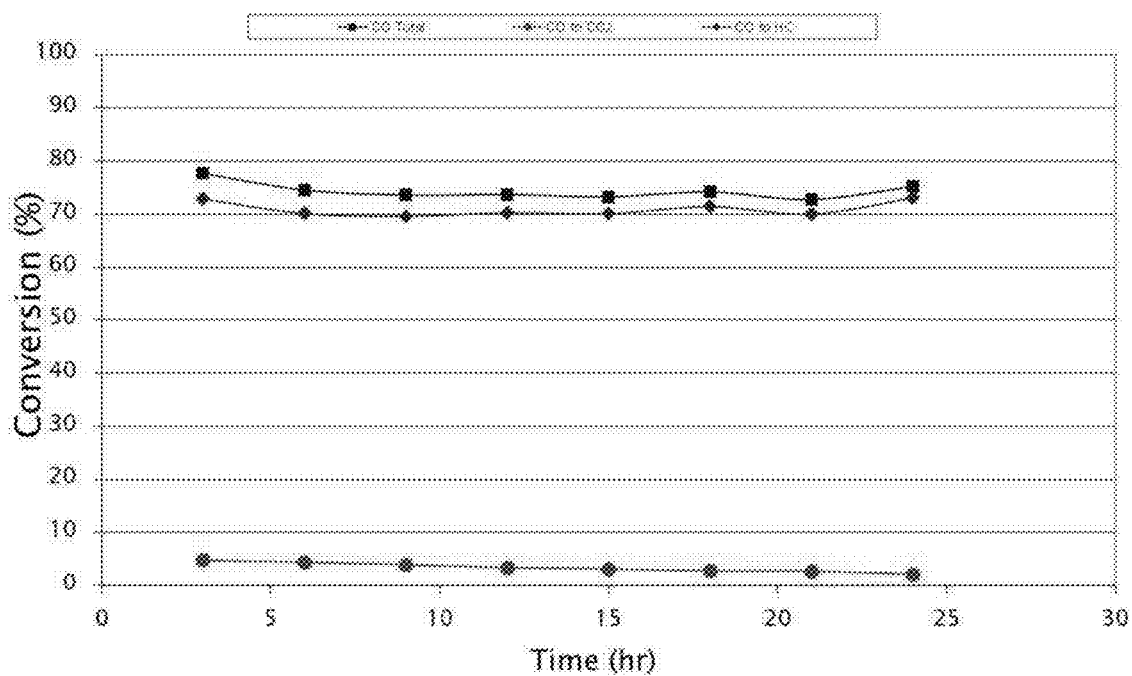
FIG. 9 illustrates a graph of the carbon monoxide conversion over time upon Fischer-Tropsch reaction using a pellet catalyst comprising cobalt/alumina/zeolite of Example 6 according to the present invention.
Figure 10:
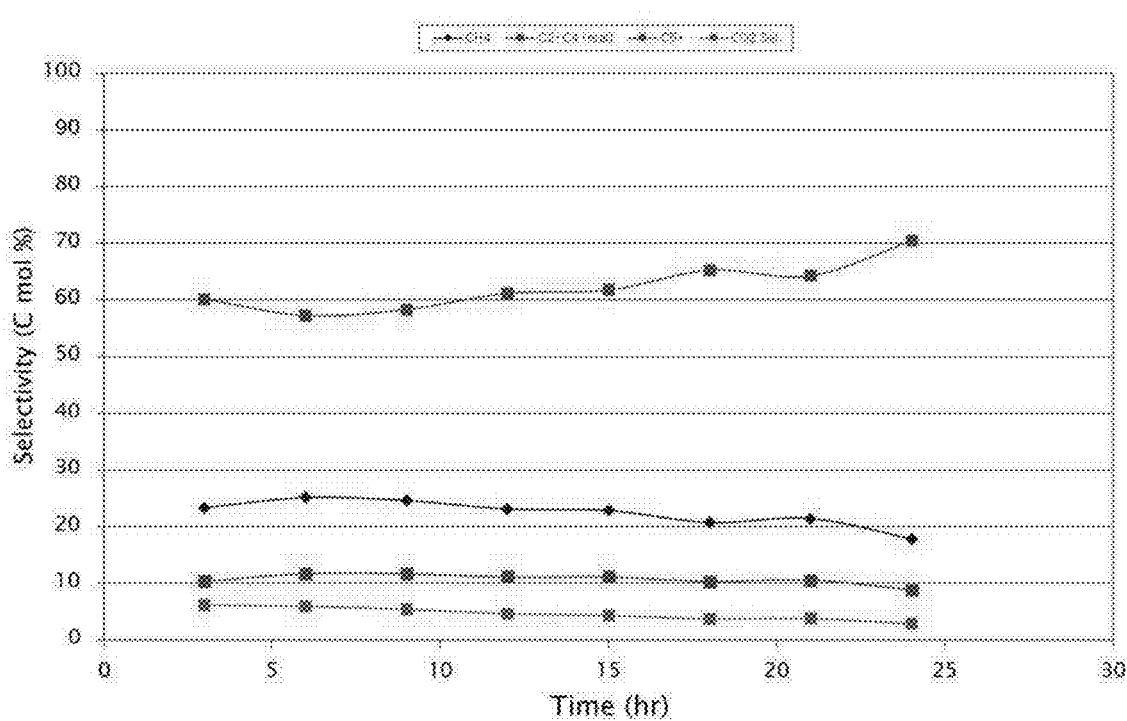
FIG. 10 illustrates a graph of the hydrocarbon selectivity over time upon Fischer-Tropsch reaction using the pellet catalyst comprising cobalt/alumina/zeolite of Example 6 according to the present invention.

After the reaction for 24 hr, the synthetic oil product was mostly recovered in a cooling trap set to 0° C. The conversion and the selectivity during the reaction for 24 hr are illustrated in FIGS. 9 and 10, respectively. As depicted in two graphs of FIGS. 9 and 10, the CO conversion was about 75%, and the $C_{5+}$ compound selectivity was about 60%.

In particular, the product recovered after the reaction for 24 hr was composed exclusively of water and oil, without formation of wax. As such, the synthetic oil productivity was 0.123 $g/g_{cat}$-h.

Figure 11:
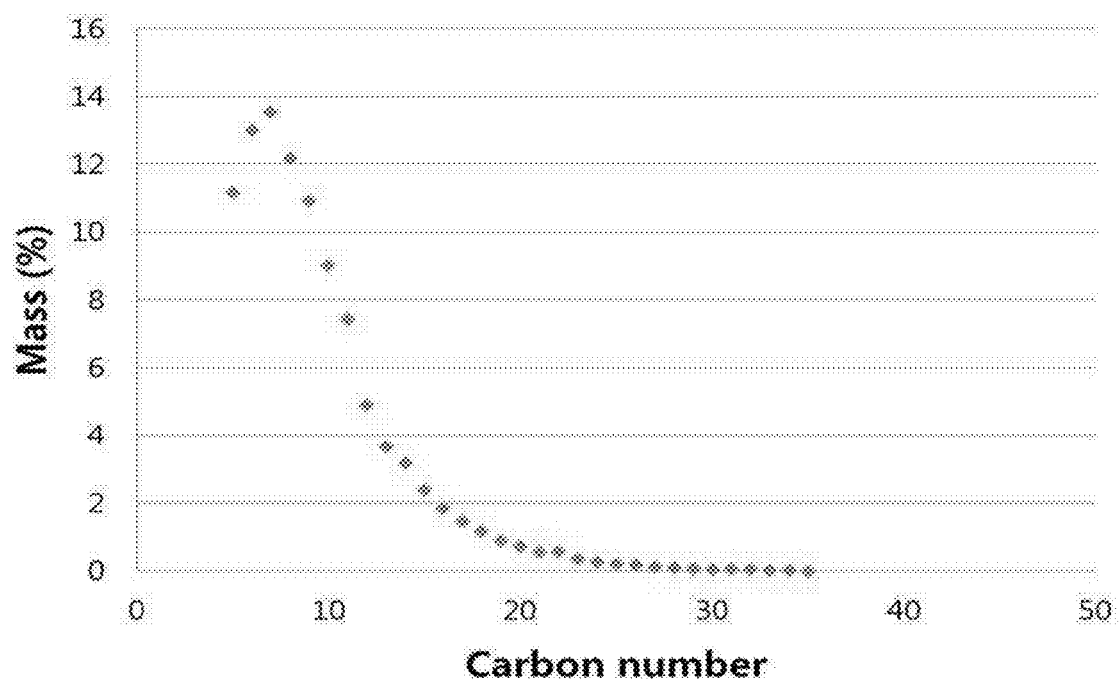
FIG. 11 illustrates a graph of the simulated distillation (SIMDIS) analytical results of oil produced using the pellet catalyst comprising cobalt/alumina/zeolite of Example 6 according to the present invention.

As illustrated in FIG. 11, based on the SIMDIS analytical results, about 70 wt % of the produced oil belonged to $C_5$-$C_{10}$ compounds, and there was almost no $C_{20+}$ compound.

COMPARATIVE EXAMPLE 1

Production of Synthetic Oil Using Cobalt/Alumina Catalyst without Zeolite

A powder obtained after excluding the step of adding zeolite to the $Co_3O_4/Al_2O_3$ catalyst of Example 1 was pelletized to a size of 0.3~0.6 mm and then subjected to Fischer-Tropsch reaction. Specifically, 9.0 g of a $Co_3O_4/Al_2O_3$ powder catalyst was mixed with 9.0 g of glass beads having a diameter of 2 mm at a ratio of 1:2 and then loaded into the reactor. Thereafter, the loaded catalyst was reduced at 400° C. for 16 hr while hydrogen gas was allowed to flow into the reactor. Then, the catalyst reduced into metal cobalt in the reactor was subjected to Fischer-Tropsch reaction at 240° C. for 24 hr under the reaction conditions of hydrogen to carbon monoxide at a volume ratio of 2:1, GHSV of 2.0 $NL/g_{cat}$-h, and a pressure of 20 atm.

Figure 12:
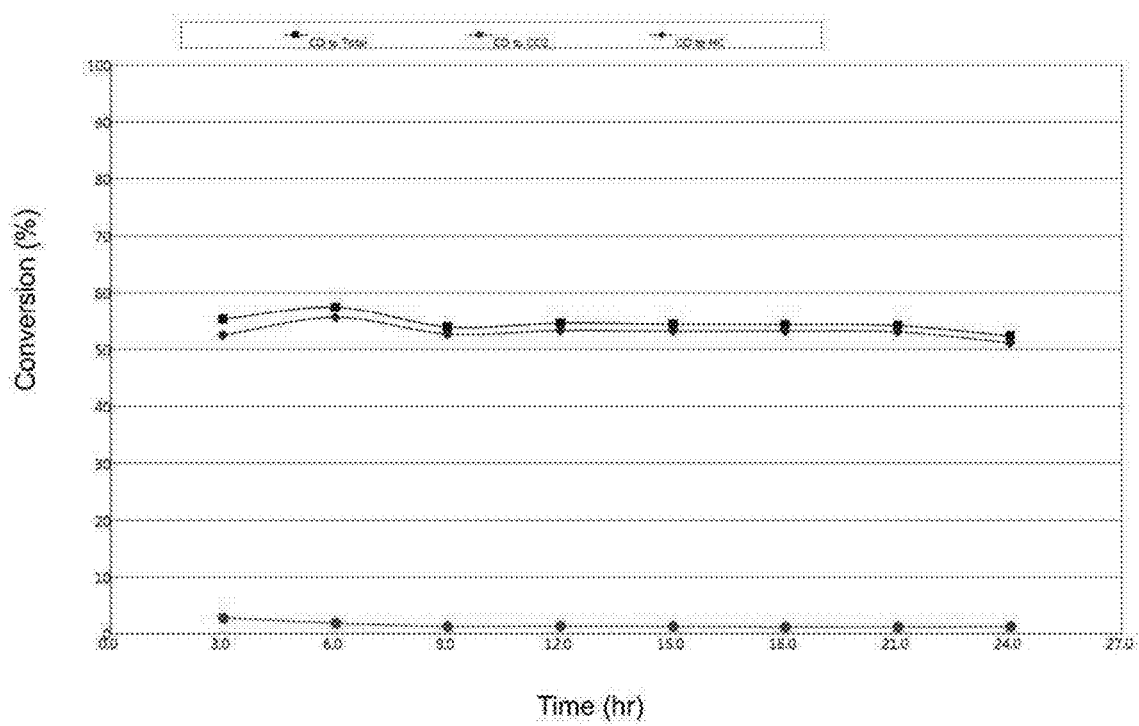
FIG. 12 illustrates a graph of the carbon monoxide conversion over time upon Fischer-Tropsch reaction using a cobalt/alumina catalyst without zeolite of Comparative Example 1 corresponding to Example 1 according to the present invention.
Figure 13:
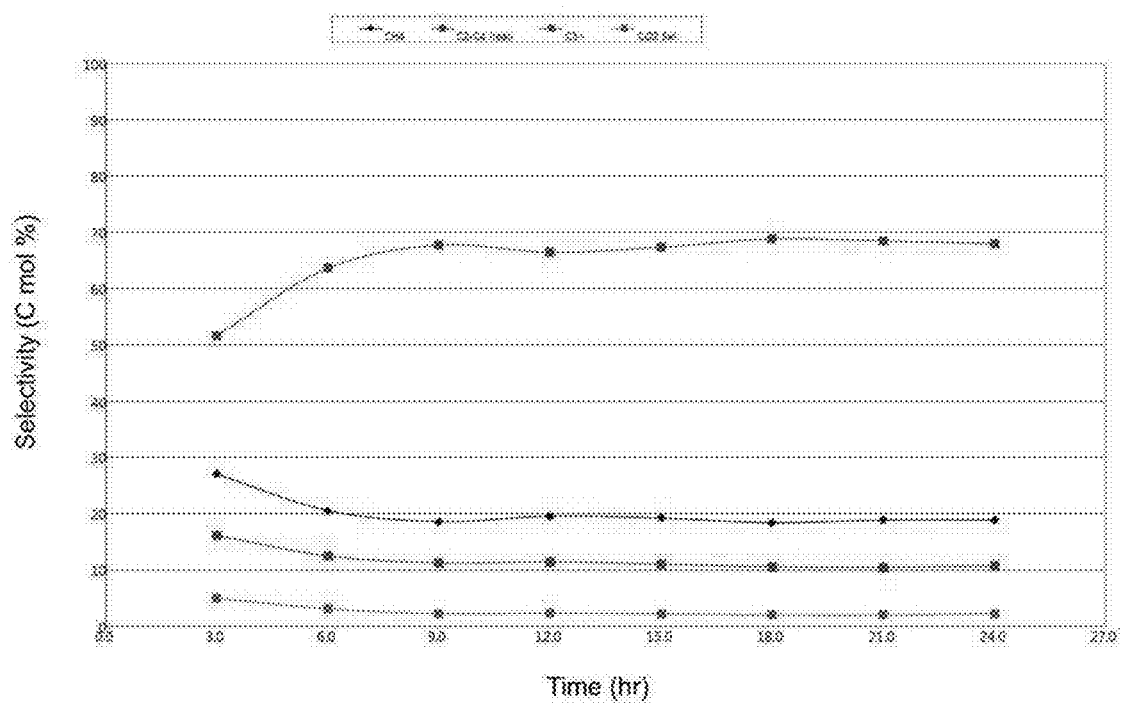
FIG. 13 illustrates a graph of the hydrocarbon selectivity over time upon Fischer-Tropsch reaction using the cobalt/alumina catalyst without zeolite of Comparative Example 1 corresponding to Example 1 according to the present invention.

After the reaction for 24 hr, the synthetic oil product was mostly recovered in a cooling trap, and some wax was recovered in a high-temperature trap at 240° C. The conversion and the selectivity during the reaction for 24 hr are illustrated in FIGS. 12 and 13, respectively. As depicted in two graphs of FIGS. 12 and 13, the CO conversion was as low as about 55%, and the $C_{5+}$ compound selectivity was as high as about 68%.

In particular, the product recovered after the reaction for 24 hr had a large amount of wax in addition to the oil. As such, the wax productivity and the synthetic oil productivity were 0.0149 $g/g_{cat}$-h and 0.1099 $g/g_{cat}$-h, respectively.

Figure 14:
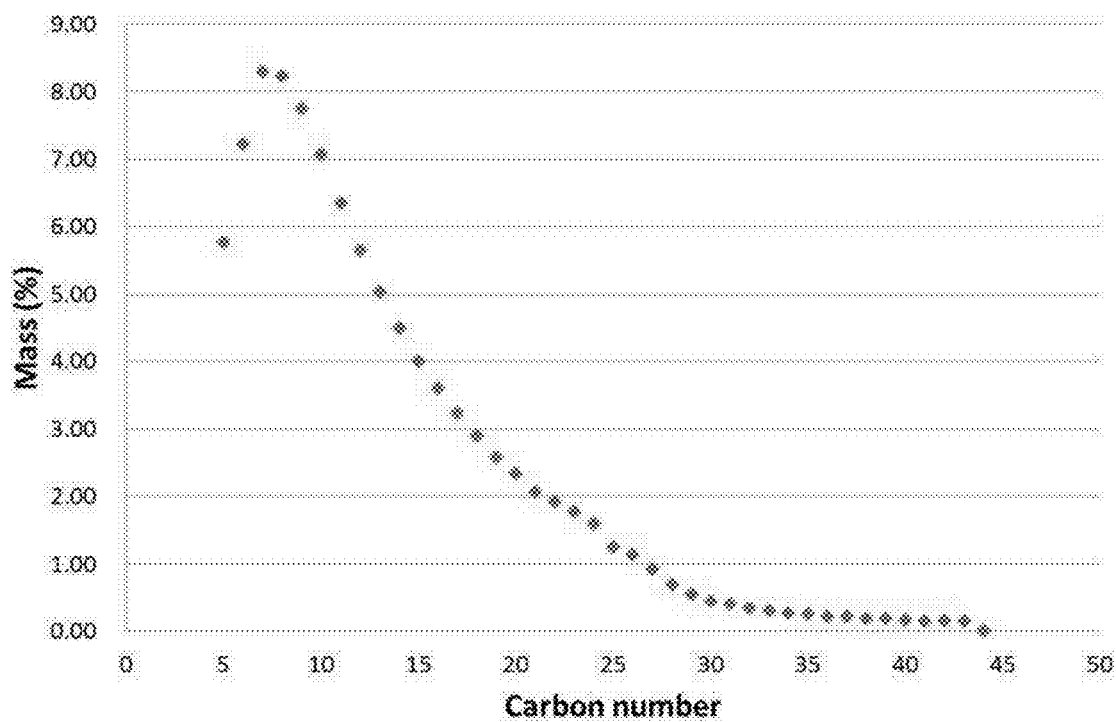
FIG. 14 illustrates a graph of the SIMDIS analytical results of oil produced using the cobalt/alumina catalyst without zeolite of Comparative Example 1 corresponding to Example 1 according to the present invention.

As illustrated in FIG. 14, based on the SIMDIS analytical results, the product had about 15 wt % of $C_{20+}$ wax, which is quite different from FIG. 11.

COMPARATIVE EXAMPLE 2

Production of Synthetic Oil Using Highly Loaded Cobalt/Silica Catalyst

Figure 15:
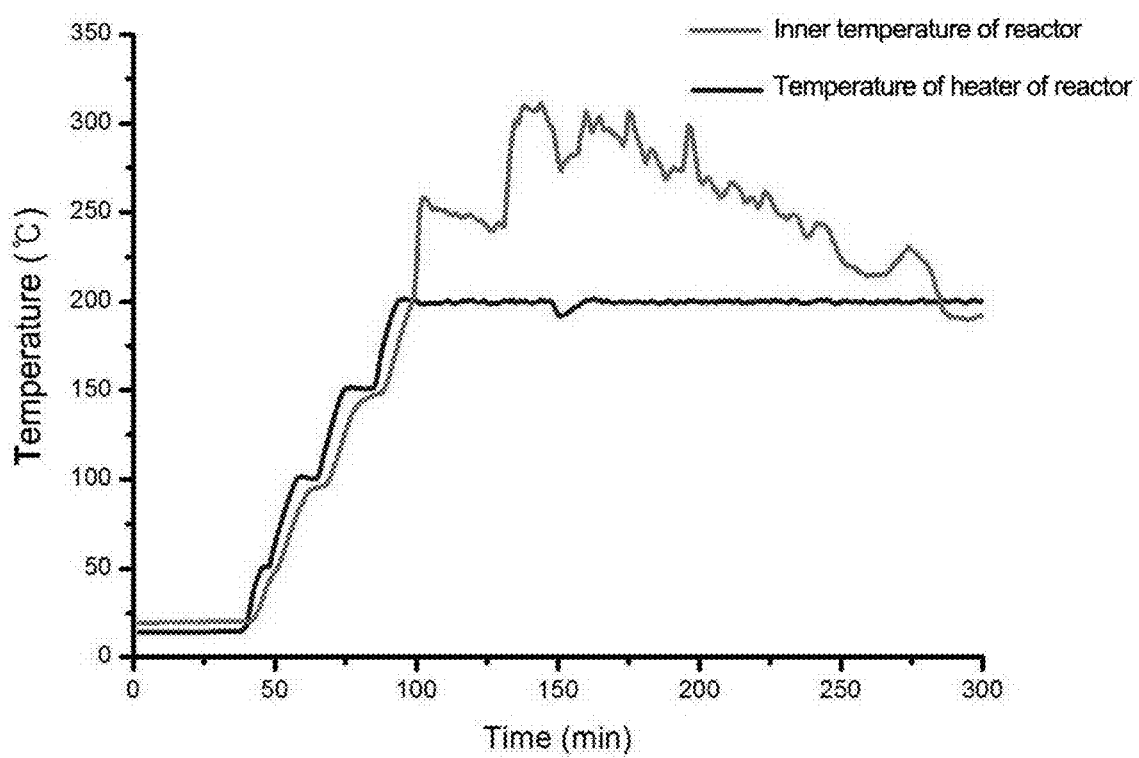
FIG. 15 illustrates a graph of changes in temperature of a catalyst bed in a reactor upon Fischer-Tropsch reaction using a pellet catalyst comprising highly loaded cobalt/silica/zeolite of Comparative Example 2 corresponding to Example 2 according to the present invention.

The $Co_3O_4$/MSU-F/ZSM-5 powder catalyst having high loading of active cobalt (Co: 36 wt %) of Example 2 was pelletized to a size of 0.3~0.6 mm and then subjected to Fischer-Tropsch reaction. Specifically, 1.5 g of a $Co_3O_4$/MSU-F/ZSM-5 powder catalyst was mixed with 30 g of glass beads having a diameter of 2 mm at a ratio of 1:20 and then loaded into the reactor. Thereafter, the loaded catalyst was reduced at 400° C. for 16 hr while hydrogen gas was allowed to flow into the reactor. Then, the catalyst reduced into metal cobalt in the reactor was directly heated up to 200° C. and subjected to Fischer-Tropsch reaction as illustrated in FIG. 15 under the reaction conditions of hydrogen to carbon monoxide at a volume ratio of 2:1, GHSV of 6.0 $NL/g_{cat}$-h, and a pressure of 20 atm. As shown in FIG. 15, upon heating to 200° C., heat was excessively generated in the reactor at the same time of initiating the reaction (lapse of 100 min after external heating), and thus the reaction temperature was 100° C. higher than the expected temperature, whereby the reaction could not be carried out anymore. This is considered to be due to the 30 wt % or more cobalt-loaded catalyst in the reactor, wherein a large amount of heat instantly generated from highly loaded cobalt was not rapidly transferred outside the reactor.

EXAMPLE 7

Production of Synthetic Oil Using Nickel Foam Catalyst Coated with Cobalt Oxide/Silica/Zeolite Particles Using the nickel foam catalyst coated with $Co_3O_4$/MSU-F/ZSM-5 particles of Example 4, Fischer-Tropsch reaction was carried out. To this end, a fixed-bed reactor was used, and the reaction procedure was controlled using an automated system operable by PC (personal computer). Then, the cobalt oxide/silica/zeolite particles on the nickel foam were closely wound in a transverse direction and then inserted into a tube reactor made of SUS material with an inner diameter of 1 inch.

The amount of the catalyst loaded on the nickel foam was 3.0 g, and the foam had a width of 15 cm and a length of 15 cm.

Thereafter, the loaded catalyst was reduced at 400° C. for 16 hr while hydrogen gas was allowed to flow into the reactor. Then, the catalyst reduced into metal cobalt was subjected to Fischer-Tropsch reaction at 280° C. for 24 hr under the reaction conditions of hydrogen to carbon monoxide at a volume ratio of 2:1, GHSV of 3.0 $NL/g_{cat}$-h, and a pressure of 20 atm.

Figure 16:
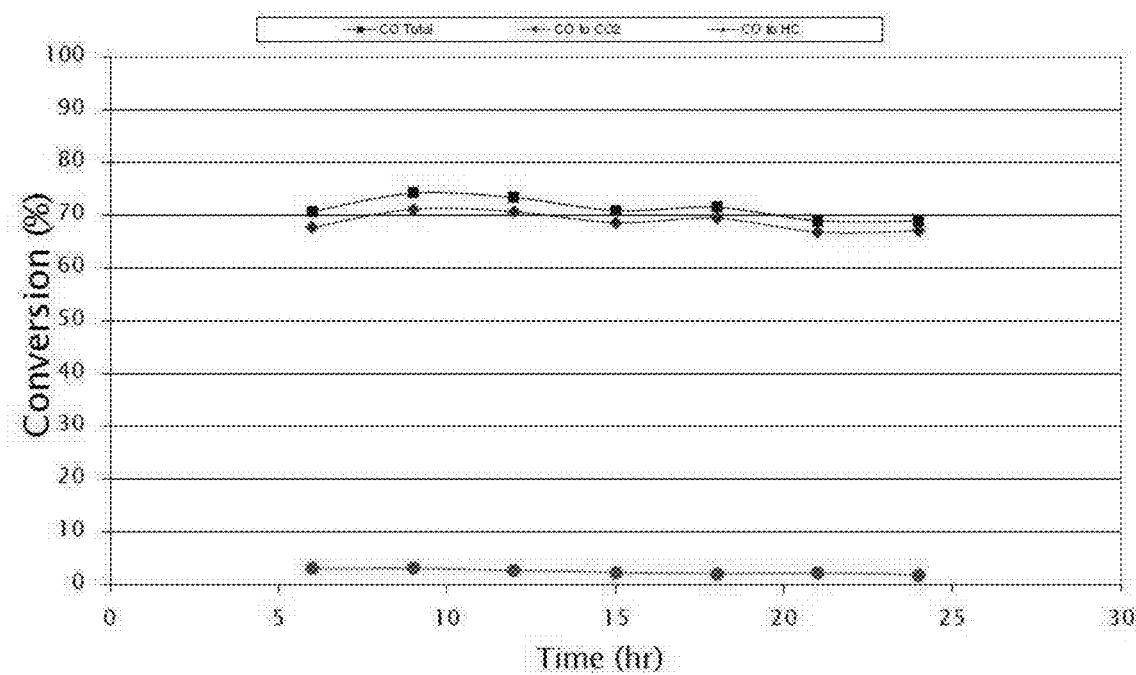
FIG. 16 illustrates a graph of the carbon monoxide conversion over time upon Fischer-Tropsch reaction using a nickel foam catalyst coated with cobalt oxide/silica/zeolite particles of Example 7 according to the present invention.
Figure 17:
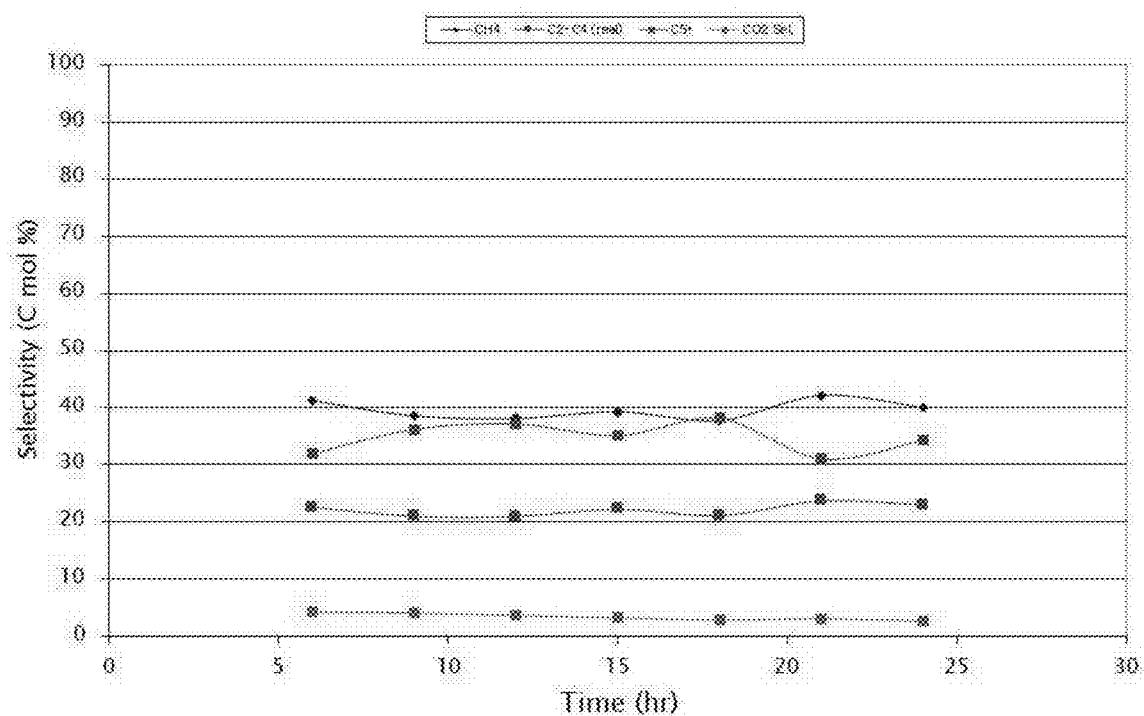
FIG. 17 illustrates a graph of the hydrocarbon selectivity over time upon Fischer-Tropsch reaction using the nickel foam catalyst coated with cobalt oxide/silica/zeolite particles of Example 7 according to the present invention.

After the reaction for 24 hr, the synthetic oil product was mostly recovered in a cooling trap. The conversion and the selectivity during the reaction for 24 hr are illustrated in FIGS. 16 and 17, respectively. As depicted in two graphs of FIGS. 16 and 17, the CO conversion was about 70%, and the $C_{5+}$ compound selectivity was about 35%.

In particular, the product recovered after the reaction for hr was composed exclusively of water and oil, without formation of wax. As such, the synthetic oil productivity was 0.153 $g/g_{cat}$-h.

Figure 18:
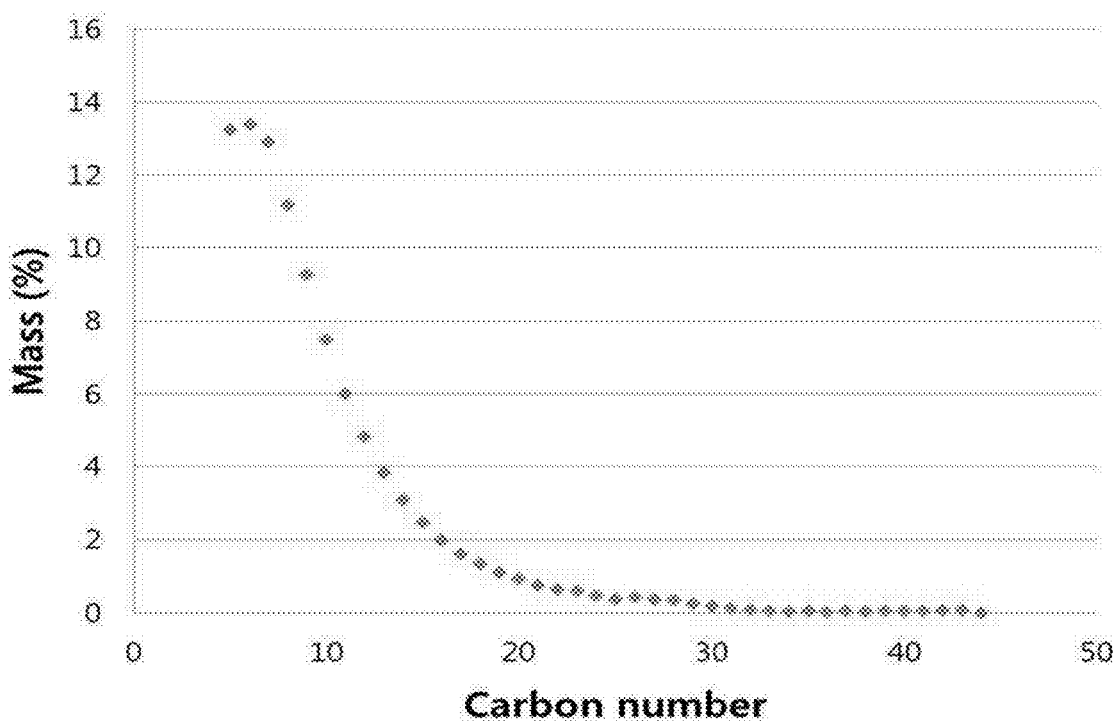
FIG. 18 illustrates a graph of the SIMDIS analytical results of oil produced using the nickel foam catalyst coated with cobalt oxide/silica/zeolite particles of Example 7 according to the present invention.

As illustrated in FIG. 18, based on the SIMDIS analytical results, there was almost no $C_{20+}$ compound.

EXAMPLE 8

Production of Synthetic Oil Using Nickel Foam Catalyst Coated with Cobalt Oxide/Ru/Silica/Zeolite Particles Using the nickel foam catalyst coated with $Co_3O_4$/Ru/MSU-F/ZSM-5 particles of Example 5, Fischer-Tropsch reaction was carried out. To this end, a fixed-bed reactor was used, and the reaction procedure was controlled using an automated system operable by PC (personal computer). Then, the cobalt oxide/Ru/silica/zeolite particles on the nickel foam were closely wound in a transverse direction and then inserted into a tube reactor made of SUS material with an inner diameter of 1 inch.

The amount of the catalyst loaded on the nickel foam was 1.0 g, and the foam had a width of 15 cm and a length of 7.5 cm.

Thereafter, the loaded catalyst was reduced at 400° C. for 16 hr while hydrogen gas was allowed to flow into the reactor. Then, the catalyst reduced into metal cobalt was subjected to Fischer-Tropsch reaction at 260° C. for 24 hr under the reaction conditions of hydrogen to carbon monoxide at a volume ratio of 2:1, GHSV of 9.0 $NL/g_{cat}$-h, and a pressure of 20 atm.

Figure 19:
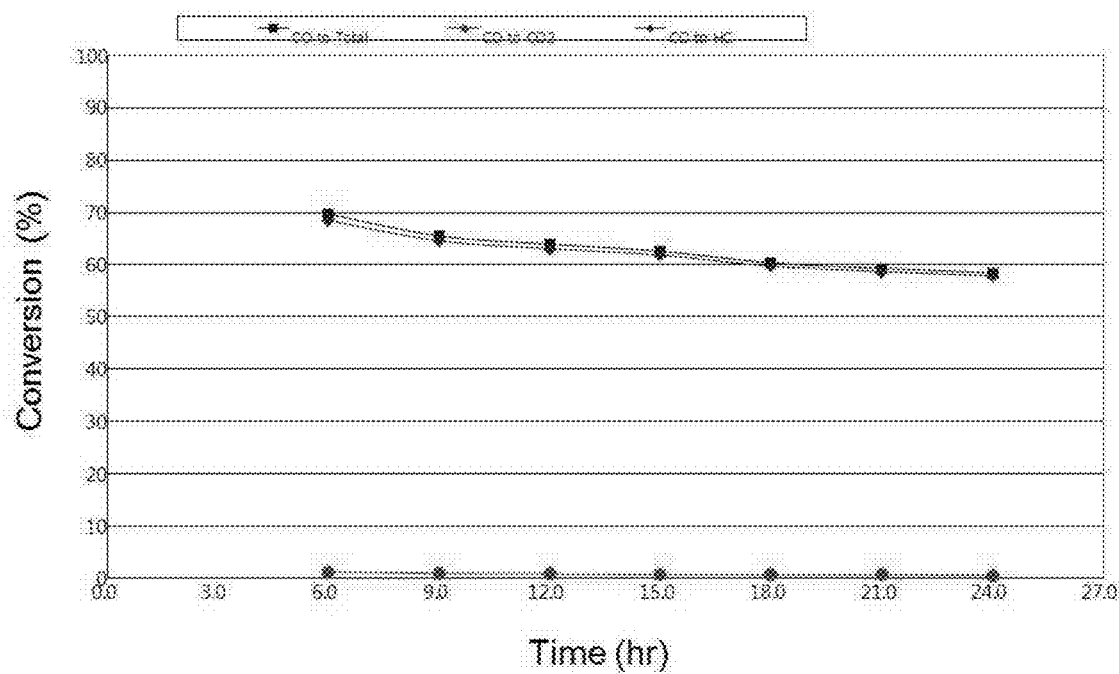
FIG. 19 illustrates a graph of the carbon monoxide conversion over time upon Fischer-Tropsch reaction using a nickel foam catalyst coated with cobalt oxide/Ru/silica/zeolite particles of Example 8 according to the present invention.
Figure 20:
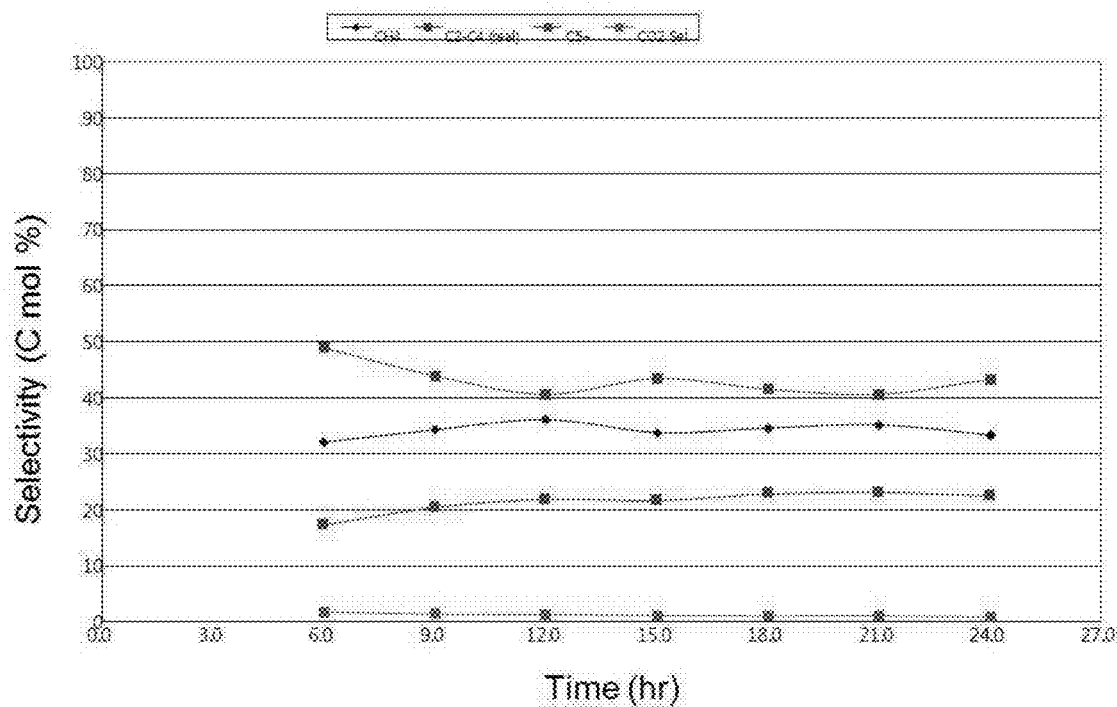
FIG. 20 illustrates a graph of the hydrocarbon selectivity over time upon Fischer-Tropsch reaction using the nickel foam catalyst coated with cobalt oxide/Ru/silica/zeolite particles of Example 8 according to the present invention.

After the reaction for 24 hr, the synthetic oil product was mostly recovered in a cooling trap. The conversion and the selectivity during the reaction for 24 hr are illustrated in FIGS. 19 and 20, respectively. As depicted in two graphs of FIGS. 19 and 20, the CO conversion was about 60%, and the $C_{5+}$ compound selectivity was about 40%.

In particular, the product recovered after the reaction for hr was composed exclusively of water and oil, without formation of wax. As such, the synthetic oil productivity was as high as 0.36 $g/g_{cat}$-h.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A method of preparing a cobalt-based catalyst on a metal structure for selective production of a synthetic oil via Fischer-Tropsch reaction, comprising:
   burning a powder mixture obtained by melt infiltration of a cobalt hydrate and a metal oxide support to give a catalyst powder comprising cobalt oxide/metal oxide support;
   hybridizing the catalyst powder comprising cobalt oxide/metal oxide support with a zeolite powder to give a hybrid catalyst powder;
   mixing the hybrid catalyst powder with an organic binder and an inorganic binder and grinding the mixed hybrid catalyst powder to give a hybrid catalyst sol;
   spray-coating a metal structure surface-treated with alumina by atomic layer deposition with the hybrid catalyst sol; and
   thermally treating the metal structure spray-coated with the hybrid catalyst sol.

2. The method of claim 1, wherein mixing the hybrid catalyst powder with the organic binder and the inorganic binder and grinding the mixed hybrid catalyst powder to give the hybrid catalyst sol comprises preparing a hybrid catalyst sol further comprising ruthenium.

3. The method of claim 2, wherein the ruthenium is contained in an amount of 1~5 wt % based on a total weight of a catalyst comprising cobalt oxide/ruthenium/metal oxide support obtained by dissolving a ruthenium salt in a hybrid catalyst sol solution, coating the metal structure with the hybrid catalyst sol, and performing burning and thermal treatment to result in decomposition.

4. The method of claim 1, wherein the cobalt hydrate is any one selected from among $Co(NO_3)_2 6H_2O$ (m.p.=55° C.), $CoCl_2 6H_2O$ (m.p.=86° C.), and $CoSO_4 7H_2O$ (m.p.=96.8° C.).

5. The method of claim 1, wherein the cobalt oxide is loaded in an amount of 15~40 wt % based on a total weight of the catalyst comprising the metal oxide support that is thermally decomposed at a high temperature after infiltration.

6. The method of claim 1, wherein the metal oxide support is a porous silica or alumina having a pore volume of 0.4 $cm^3/g$ or more and an effective surface area of 100 $m^2/g$ or more.

7. The method of claim 1, wherein the burning is performed by thermal treatment at 300~500° C. in an atmosphere, thus obtaining cobalt oxide particles having a size of 5~50 nm.

8. The method of claim 1, wherein the melt infiltration is performed for 1~48 hr in a closed system at a temperature 2~5° C. higher than a melting point of the cobalt hydrate.

9. The method of claim 1, wherein the zeolite is added such that an amount thereof is 5~30 wt % based on a total weight of the hybrid catalyst.

10. The method of claim 1, wherein the hybrid catalyst sol is prepared in such a manner that the hybrid catalyst powder is added in an amount of 1~10 wt % to a dispersion solution comprising the organic binder, the inorganic binder and a solvent mixture of distilled water and ethanol, ground to a size of 900 nm or less and dispersed.

11. The method of claim 10, wherein the organic binder is PVB (Polyvinyl butyral), PVP (Polyvinylpyrrolidone) or PVA (Polyvinyl alcohol), and the inorganic binder is alumina sol or silica sol.

12. The method of claim 1, wherein the metal structure comprises nickel, copper or a combination of nickel and copper, with a pore size of 1.2~0.45 mm.

13. The method of claim 1, wherein the atomic layer deposition is performed a total of 60~100 cycles at a substrate temperature of 120° C. so that alumina has a thickness of 12~20 nm.

14. The method of claim 1, wherein the hybrid catalyst sol is sprayed on the metal structure at a rate of 1~10 mL/sec upon spray-coating, so that an amount of loaded hybrid catalyst sol per an area of the metal structure is 4~40 $mg/cm^2$.

15. The method of claim 14, wherein a temperature of a support plate for supporting a bottom of the metal structure is maintained at 40~90° C.

\* \* \* \* \*